United States Patent [19]
Izukawa

[11] Patent Number: 5,754,904
[45] Date of Patent: May 19, 1998

[54] CAMERA UTILIZING CARTRIDGE WITH MOVABLE LIGHT SHIELD COVER

[75] Inventor: Kazuhiro Izukawa, Misato, Japan

[73] Assignee: Canon Kabushiki Kaisha, Tokyo, Japan

[21] Appl. No.: 190,360

[22] Filed: Feb. 2, 1994

[30] Foreign Application Priority Data

Feb. 3, 1993 [JP] Japan ................................. 5-037306
Sep. 29, 1993 [JP] Japan ................................. 5-264099

[51] Int. Cl.$^6$ ................................................. G03B 17/24
[52] U.S. Cl. .......................... 396/390; 396/408; 396/513
[58] Field of Search ............................ 354/288, 289.1, 354/174, 173.1, 173.11, 275; 396/513, 390, 408, 512, 514, 406

[56] References Cited

U.S. PATENT DOCUMENTS

| | | | |
|---|---|---|---|
| 4,938,429 | 7/1990 | Robertson et al. | 242/71.1 |
| 4,982,211 | 1/1991 | Suzuki. | |
| 5,126,899 | 6/1992 | Kanazawa. | |
| 5,142,319 | 8/1992 | Wakabayashi et al. | |
| 5,220,371 | 6/1993 | Tanii et al. | 396/512 |
| 5,307,101 | 4/1994 | Tanii et al. | |
| 5,319,406 | 6/1994 | Takatori. | |
| 5,359,376 | 10/1994 | Ogihara et al. | |

FOREIGN PATENT DOCUMENTS

| | | |
|---|---|---|
| 01191836 | 8/1989 | Japan. |
| 01191837 | 8/1989 | Japan. |
| 04343353 | 11/1992 | Japan. |

*Primary Examiner*—David M. Gray
*Attorney, Agent, or Firm*—Fitzpatrick, Cella, Harper & Scinto

[57] ABSTRACT

A camera utilizing an image recording medium cartridge provided with a cover for extracting and introducing an image recording medium comprises operation means for operating the cover of the cartridge loaded in the camera; response means for moving the cover of the cartridge in response to the operation of the operation means; and release means for maintaining the operation means in an operable state but causing the response means not to respond to the operation of the operation means in at least either of a situation where the cover of the cartridge is open and a situation where the image recording medium is extracted from the cartridge, or the camera comprises determination means for determinating, after the power supply is turned on, at least either of state of the cover of the cartridge loaded in the camera prior to the turning-on of the power supply and state of the image recording medium, or the camera comprises determination means for directly determinating state of the cover itself of the cartridge loaded in the camera or a member following the movement of the cover.

56 Claims, 22 Drawing Sheets

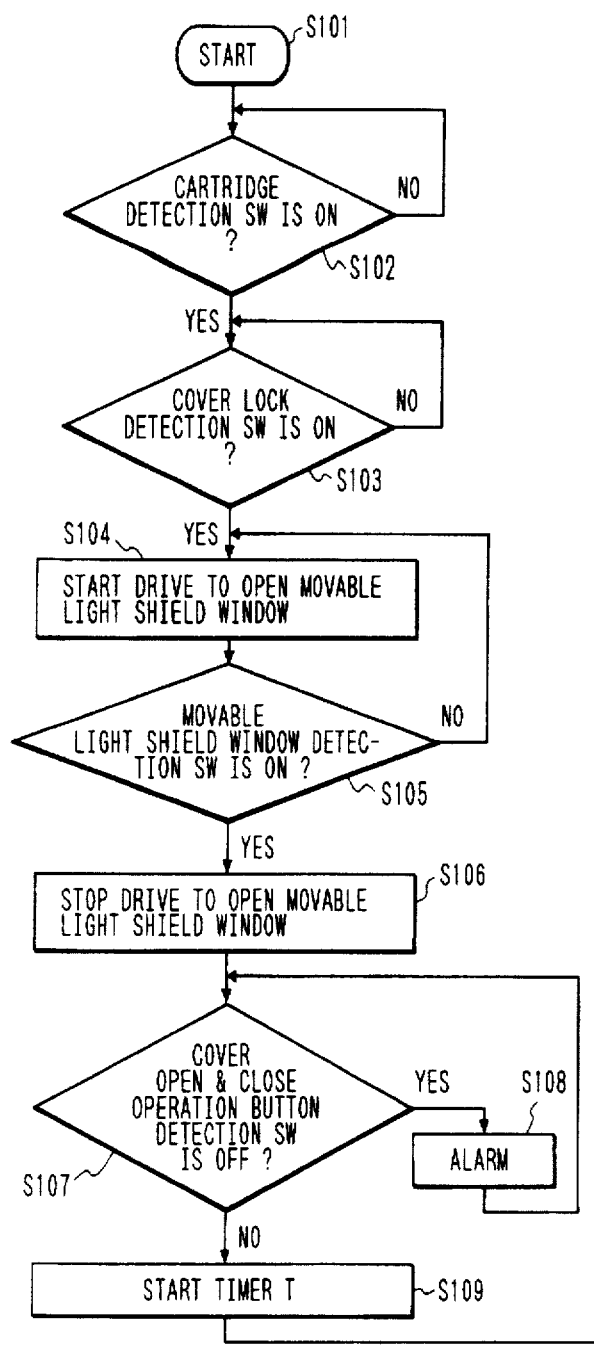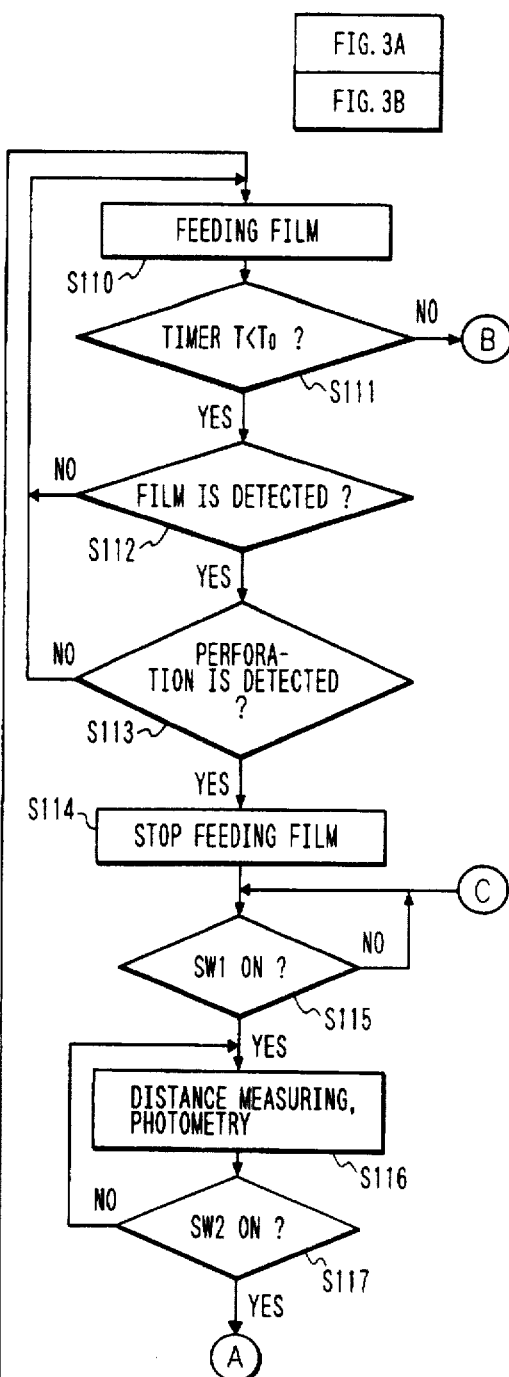

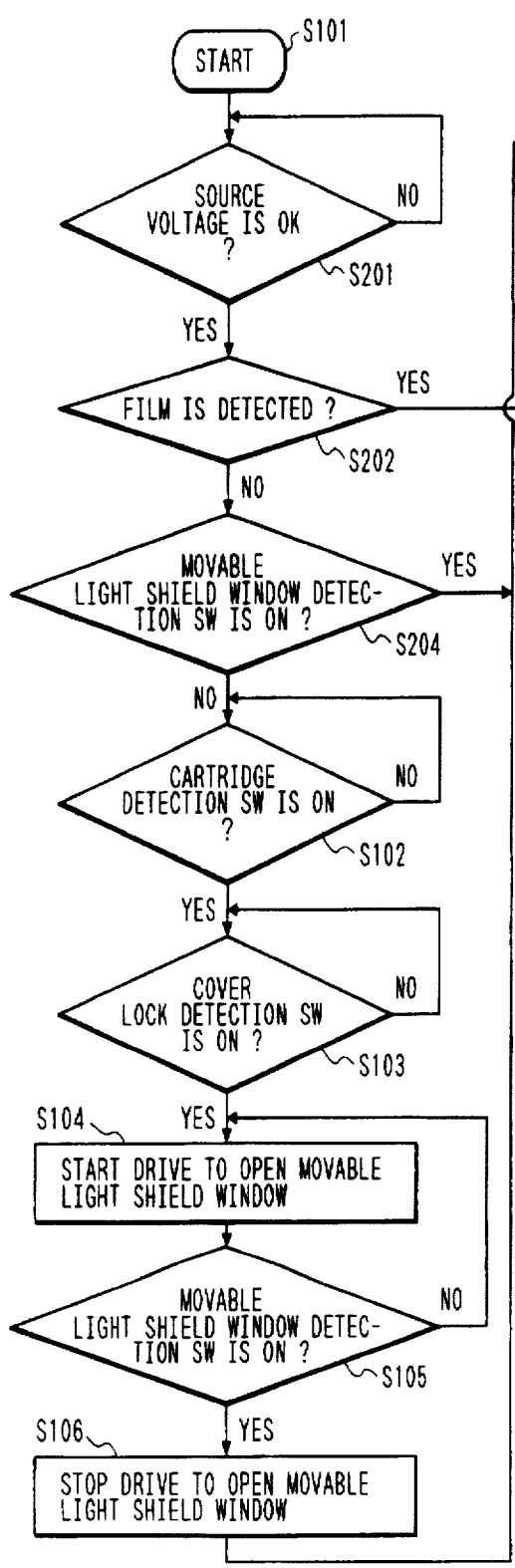
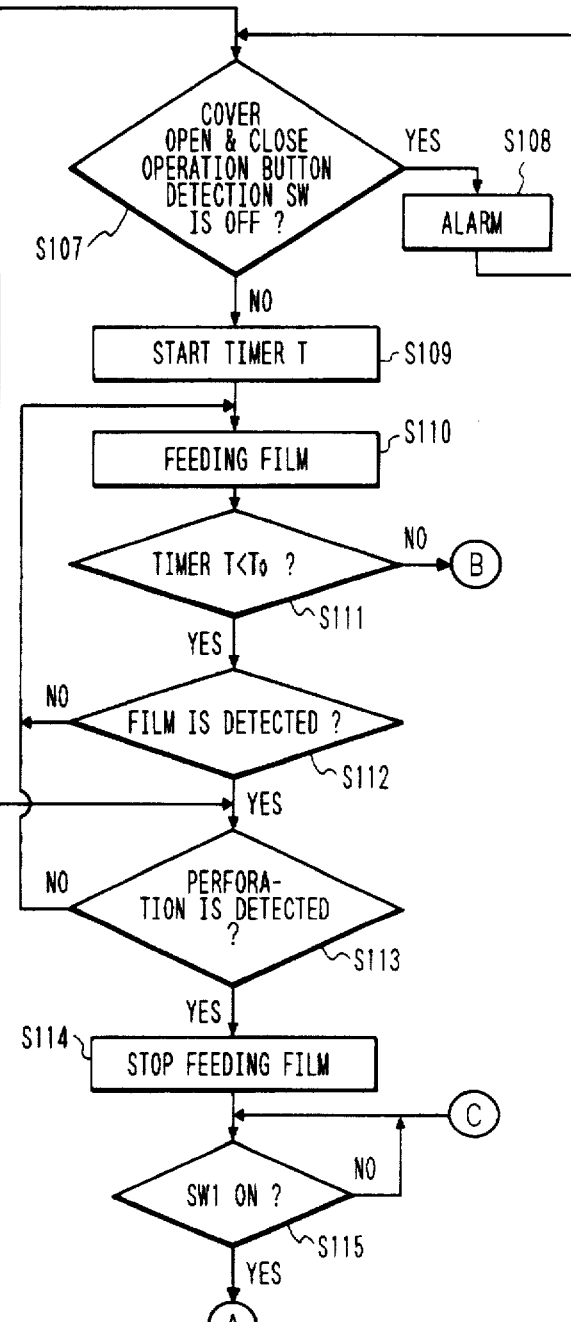

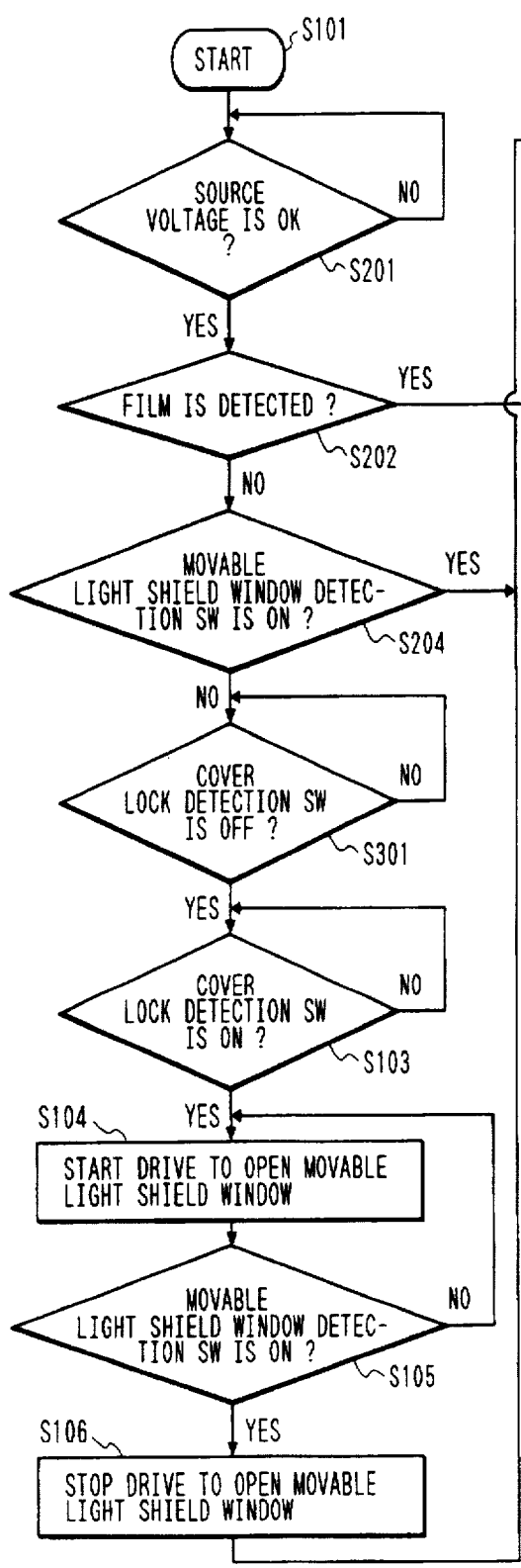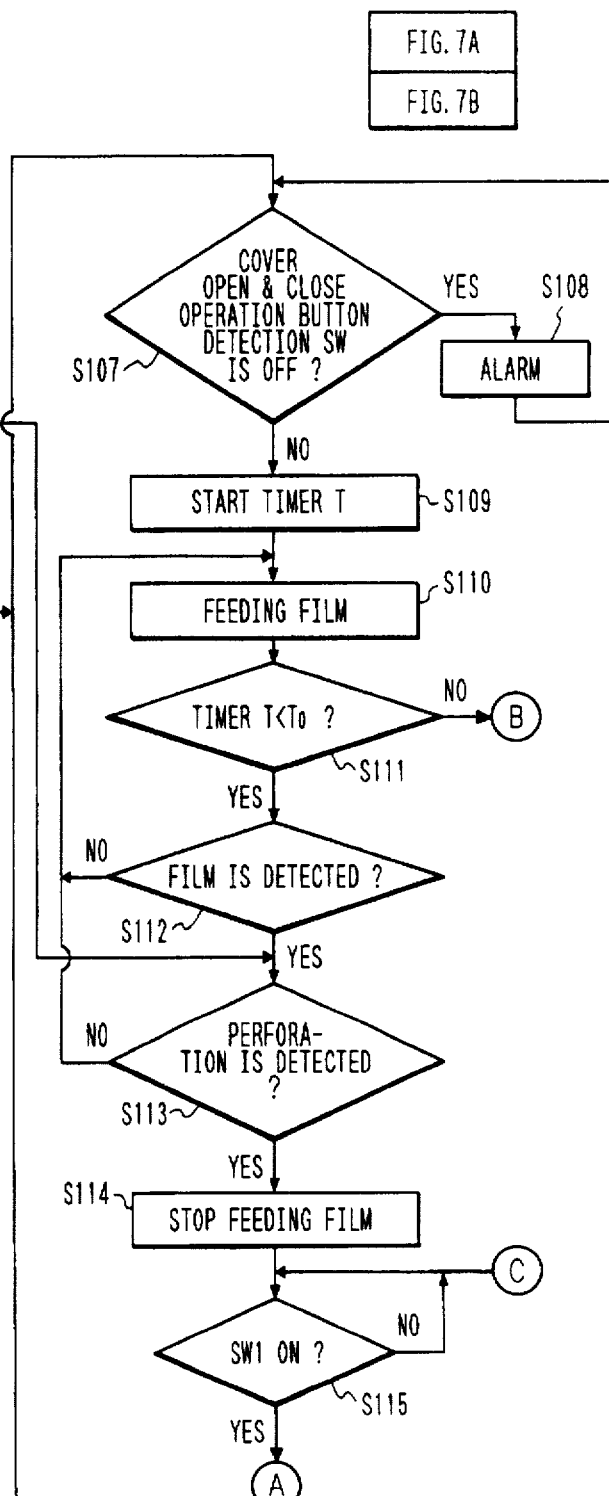
FIG. 7A
FIG. 7

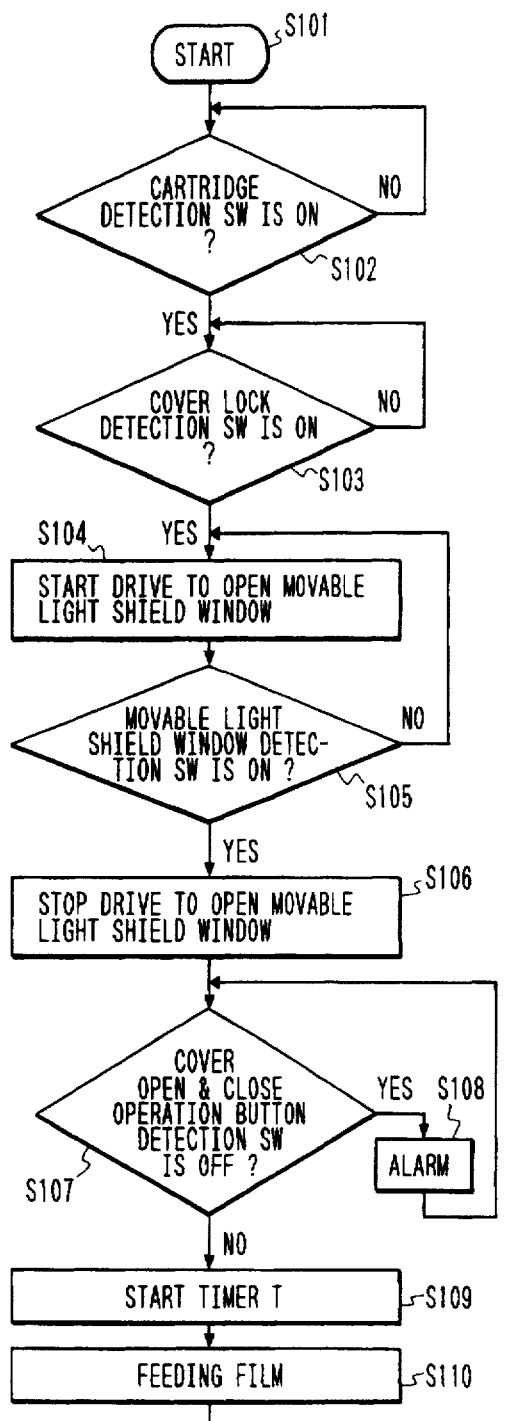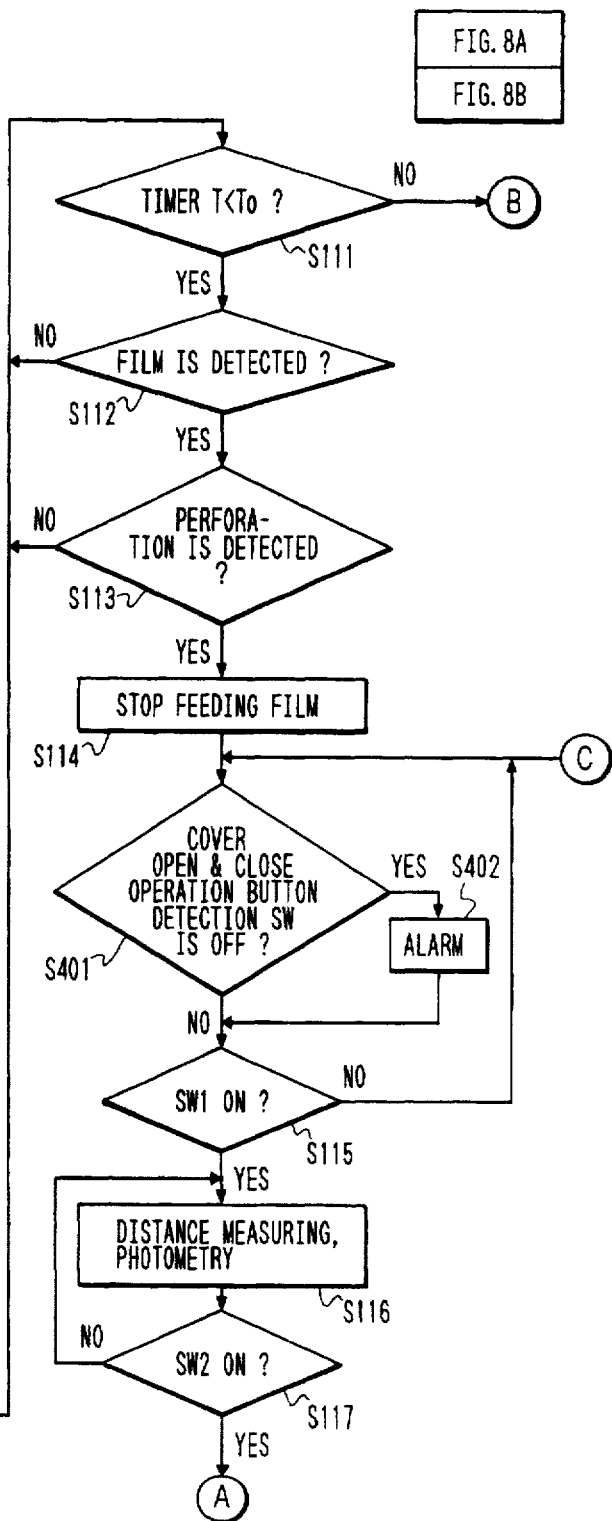

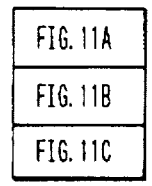
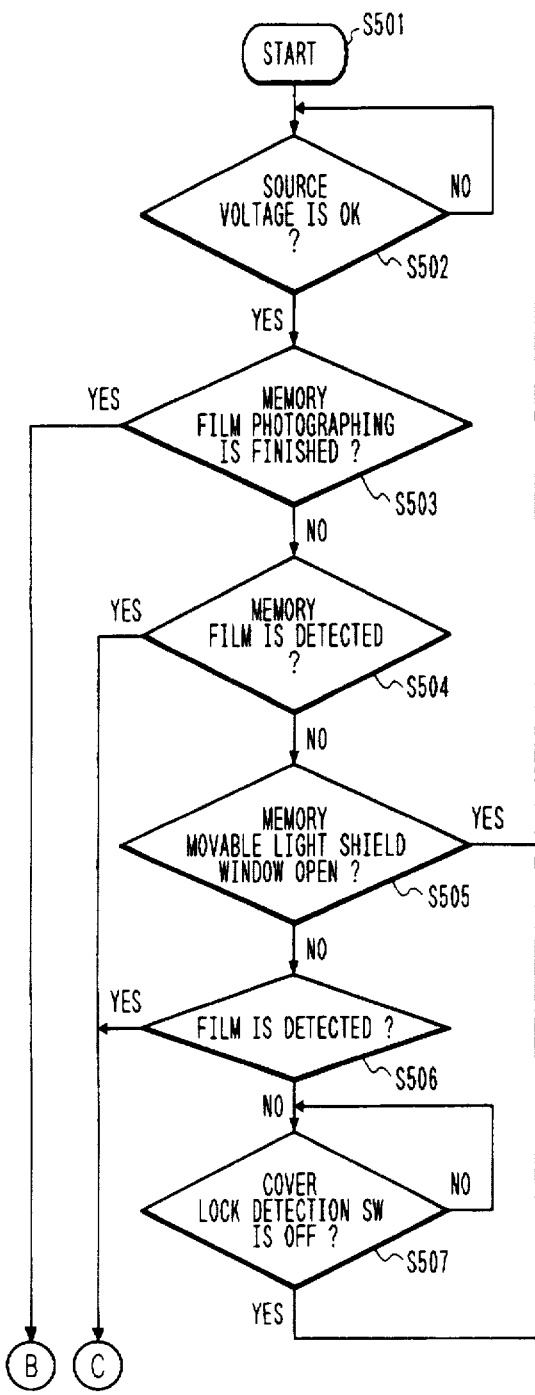
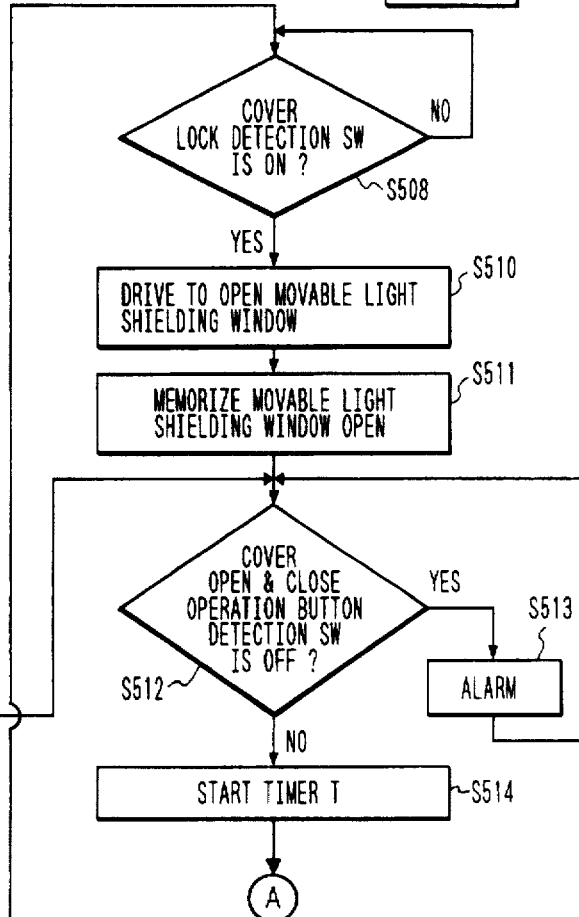

CAMERA UTILIZING CARTRIDGE WITH MOVABLE LIGHT SHIELD COVER

BACKGROUND OF THE INVENTION

1. Field of the Invention

The present invention relates to a camera utilizing a film cartridge provided with a movable light shield cover (or window) for film supply and rewinding, and more particularly to a camera equipped with a device for opening and closing such movable light shield cover.

2. Related Background Art

A camera utilizing a film cartridge with a movable light shield cover for film supply and rewinding and provided with a device for opening and closing said movable light shield cover is already disclosed, for example, in the Japanese Patent Laid-Open Application Nos. 1-191836 and 1-191837. Also other examples of the film cartridge with a movable light shield cover are disclosed in the U.S. Pat. No. 4,938,429 and in the Japanese patent Laid-Open Application No. 4-343353.

In these prior examples of the film cartridge, there are shown embodiments of opening and closing the movable light shield cover by engaging a screw driver-shaped member with a member for opening and closing the movable light shield cover and rotating the above-mentioned screw driver-shaped member.

Also in these prior examples, there are shown various embodiments such as the movable light shield cover being opened and the film being pulled out after the film cartridge is loaded in the camera and the closing of the rear cover thereof is detected by a detecting switch, or the movable light shield cover being not closed while the film is pulled out, or an alarm being given if the movable light shield cover is still open after the lapse of a predetermined time from the completion of film rewinding, or the rear cover of the camera being not openable when the movable light shield cover is opened.

In such conventional examples, however, as an operating knob for opening the rear cover of the camera is rendered inactive when the movable light shield cover of the loaded film cartridge is open, the user may apply an excessive force to forcedly operate said knob and may destruct the knob mechanism.

Also such conventional examples may result in troubles at the battery replacement, since consideration has not been given to the opening and closing of the movable light shield cover at the replacement of the battery of the camera.

Furthermore, in such conventional examples, there is no assurance whether the opening or closing operation of the movable light shield cover of the film cartridge has been securely conducted, and there is a possibility of damage to the film etc.

SUMMARY OF THE INVENTION

In one aspect of the present invention, there is provided a camera utilizing an image recording medium cartridge having a cover for extracting and rewinding the image recording medium, comprising operation means for operating said cover of said cartridge loaded in said camera, response means for moving said cover in response to the operation of said operation means, and release means for maintaining said operation means operable but causing said response means not to respond to the operation of said operation means in at least either of the cases where said cover of said cartridge is opened and where said image recording medium is pulled out from said cartridge, whereby the damage to said image recording medium by the closing of said cover can be prevented, even if said operation means is operated while said image recording medium is pulled out from said cartridge, without the possibility of destruction of said operation means or said response means.

In another aspect of the present invention, there is provided a camera comprising determination means for identifying, after the power supply is turned on, at least either of the states of said cover and said image recording medium, before the power supply is turned on, of the cartridge loaded in said camera, thereby being capable of avoiding troubles at the turning-on of the power supply.

In still another aspect of the present invention, there is provided a camera comprising determination means for directly identifying the state of said cover itself of said cartridge loaded in said camera or a member following the movement of said cover, thereby securely ensuring the function of said cover.

Still other aspects of the present invention will become fully apparent from the following description of the preferred embodiments.

DETAILED DESCRIPTION OF THE PREFERRED EMBODIMENTS

Now the present invention will be clarified in detail by preferred embodiments thereof, with reference to the attached drawings.

Figure 1:
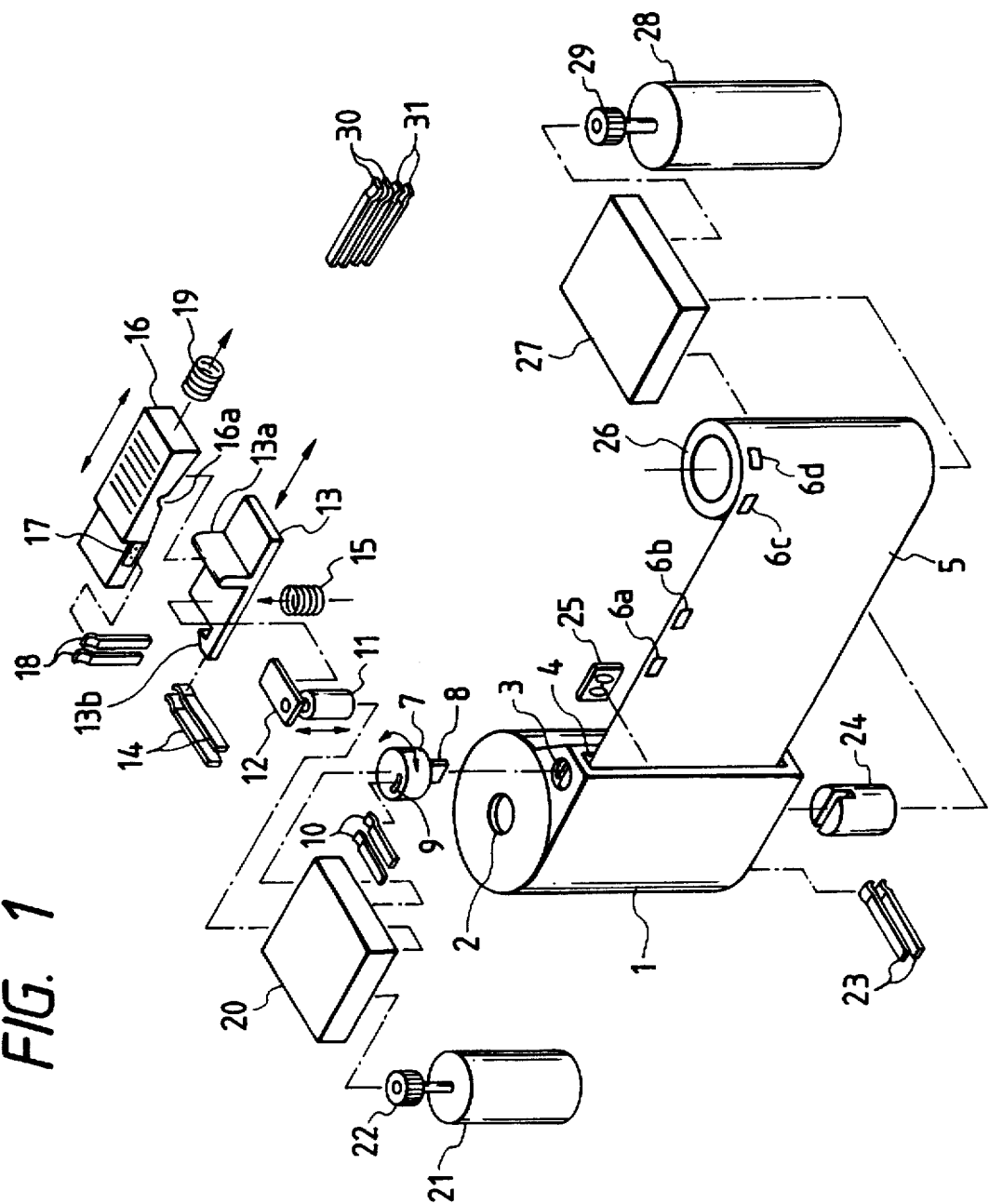
FIG. 1 is an exploded perspective view of principal parts of a camera constituting a first embodiment of the present invention.

FIGS. 1 to 3B illustrate a 1st embodiment of the present invention. FIG. 1 is an exploded perspective view of principal parts of a camera, constituting the 1st embodiment of the present invention, wherein shown are a cartridge 1 housing a film; a spool shaft 2 of the cartridge 1; an engaging part 3 for opening and closing a movable light shield cover of the cartridge 1; a movable light shield cover 4, which can be opened for film extraction, of the cartridge 1; a film 5 extracted from the cartridge 1 through the movable light shield cover 4; perforations 6a, 6b, 6c, 6d formed on the film 5; a driving member 7 for the engaging part 3 for opening and closing the movable light shield cover; an engaging projection 8 of the driving member 7; an electrode piece 9 formed as an arc around the rotary shaft of the driving member 7; and a switch 10 for detecting the state of the movable light shield cover, to be closed by the electrode piece 9. The detecting switch 10 is turned on in the illustrated state where the movable light shield cover 4 is open.

There are further shown a retracting gear 11 acting on a rear cover operating member 13 for opening a rear cover (not shown) of a cartridge chamber of the camera in which the cartridge 1 is to be loaded; a retracting finger 12 integral with the retracting gear 11; a rear cover operating member 13 integrally movable with the rear cover of the cartridge chamber in a direction indicated by an arrow, thereby opening or closing said rear cover; an engaging portion 13a formed on the rear cover operating member 13 and engaging with a rear cover operating knob 16 positioned thereon; a rear cover locking finger 13b formed on the rear cover operating member 13 and adapted to lock the rear cover of the cartridge chamber, engaging with an engaging portion provided in an unrepresented camera body; a rear cover locking detection switch 14 to be closed when the locking finger 13b engages with the main body of the camera; and a spring 15 pushing the rear cover operating member 13 upwards and pinching the rear cover operating member 13 from below and above in cooperation with the retracting finger 12, whereby the ascent or descent thereof causes the engaging part 13a of the rear cover operating member 13 to engage with or disengage from the engaging portion 16a of the rear cover operating knob 16.

There are further shown the rear cover operating knob 16 mentioned above, rendered movable in the direction of an arrow by a manual operation from the exterior of the camera; an engaging part 16a formed on the rear cover operating knob 16 and adapted to engage with the engaging part 13a of the rear cover operating member 13 whereby the rear cover operating member 13 opens or closes the rear cover of the cartridge chamber in linkage with the manipulation of the rear cover operating knob 16 in the direction indicated by the arrow; an electrode piece 17 provided on the rear cover operating knob 16; a detection switch 18 for detecting the state of the rear cover operating knob, to be turned on by the electrode piece 17 when the unrepresented rear cover of the cartridge chamber is moved in a closing direction; a spring 19 biasing the rear cover operating knob 16 in a direction opposite to the closing direction of the rear cover of the cartridge chamber; power transmission means 20 for transmitting the rotation of a motor 21 to the driving member 7 and the retracting gear 11, thereby driving the retracting gear 11 to disengage the rear cover operating member 13 from the rear cover operating knob 16 through a known differential mechanism and then driving the driving member 7 to open the movable light shield cover 4. In the closing operation of the movable light shield cover 4, it drives the driving member 7 to close the movable light shield cover 4 and then drives the retracting gear 11 to bring the rear cover operating member 13 in engagement with the rear cover operating knob 16.

There are further shown the motor 21 for opening and closing the movable light shield cover; a gear 22; a cartridge detection switch 23 to be closed when the cartridge 1 is loaded in the camera; a power transmission fork 24 for engaging with the spool shaft 2 thereby pushing the film 5 out of the cartridge 1 through the movable light shield cover 4 and also rewinding the film 5; a photoreflector 25 for detecting the film 5 and the perforations 6a, 6b, 6c, 6d thereof; a winding spool 26 for the film 5; power transmission means 27 for transmitting the power to the power transmitting fork 25 and the winding spool 26 thereby effecting the operations of pushing the film 5 out of the cartridge 1 and winding said film 5, and of rewinding the film 5 into the cartridge 1; a film feeding motor 28 for providing the power transmission means 27 with a driving force; a gear 29; and switches 30, 31 to be closed in succession by the depression of an unrepresented shutter release button and to be respectively referred to as SW1 and SW2.

Figure 2:
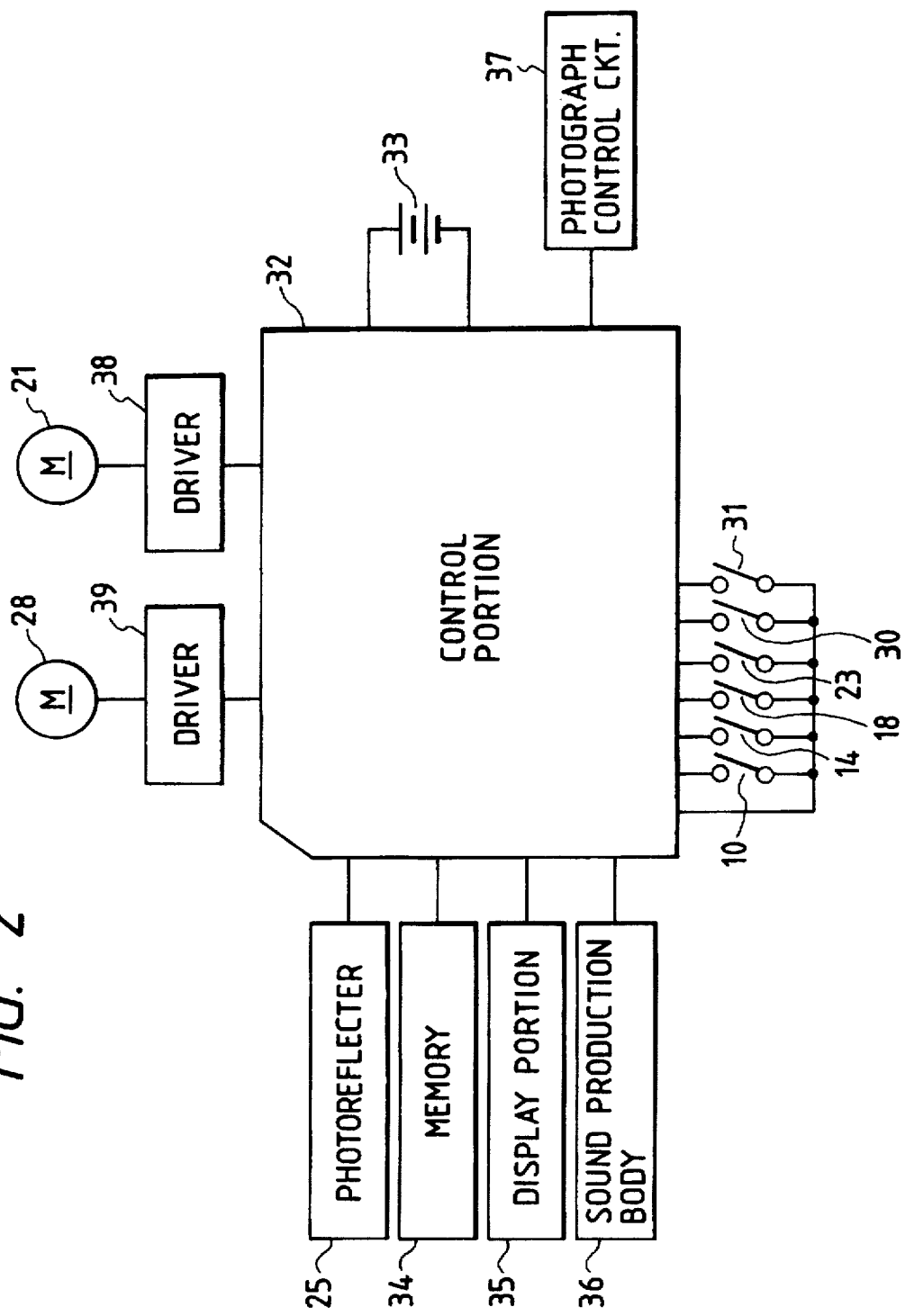
FIG. 2 is a block diagram of electrical circuits of the camera shown in FIG. 1.

FIG. 2 is a block diagram of electrical circuits of the first embodiment of the present invention, wherein same components as those in FIG. 1 are represented by same numbers and will not be explained further. In FIG. 2, there are shown a control unit 32 composed for example of a microcomputer; a battery 33; a non-volatile memory 34; a display unit 35; a sound generating device 36; an already known phototaking control circuit 37 for effecting distance measurement, light metering, shutter control etc.; and motor drivers 38, 39 for driving the aforementioned motors 21, 28.

Figure 3B:
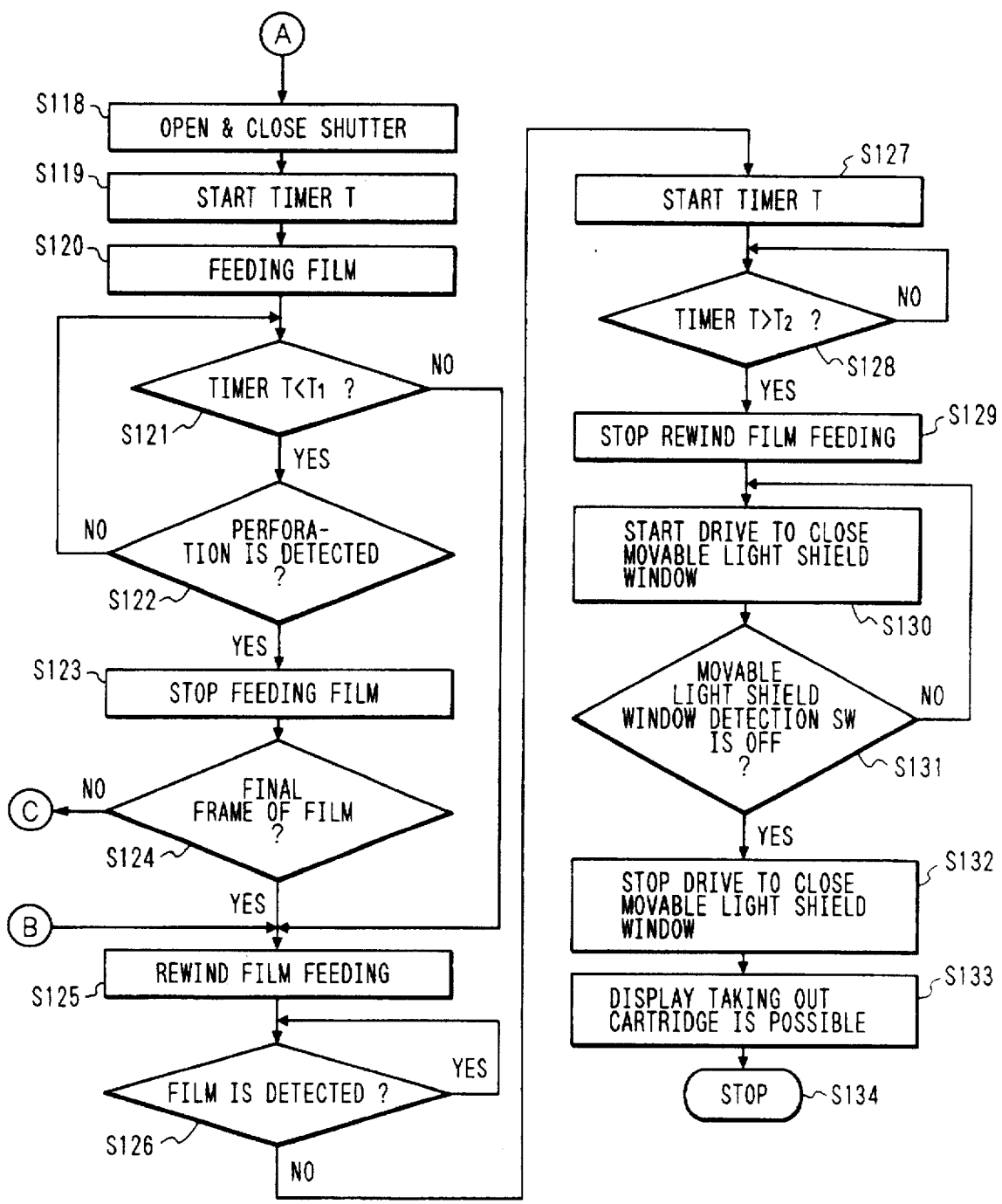
FIG. 3 is comprised of FIGS. 3A and 3B illustrating flow charts showing the control sequence of a control unit shown in FIG. 2.

In the following there will be explained the functions of the configurations shown in FIGS. 1 and 2, with reference to a flow chart in FIGS. 3A and 3B, showing the control sequence of the control unit 32 shown in FIG. 2.

After the sequence is started (step 1: step being hereinafter referred to as S), the state of the cartridge detection switch 23 is discriminated (S102), thereby detecting that the cartridge 1 has been loaded in the unrepresented camera body. Then there is discriminated the state of the rear cover locking detection switch 14 (S103), which is on or off respectively when the rear cover of the unrepresented cartridge chamber is closed or opened.

If the rear cover locking detection switch 14 is on, the motor driver 38 starts to drive the motor for opening and closing the movable light shield cover, in a direction to open the movable light shield cover (S104), whereby the power transmitting means 20 at first causes the retracting gear 11 to move the retracting finger 12 in a direction to disengage the rear cover operating member 13 from the rear cover operating knob 16, and thereafter drives the driving member 7 in a direction to open the movable light shield cover 4 through the engaging projection 8 and the engaging part 3.

Subsequently there is discriminated whether the movable light shield cover detecting switch 10 is on (S105), and, if not, the sequence returns to the step S104, but, if on, the motor driver 38 deactivates the motor 21 for opening and closing the movable light shield cover (S106). If the rear cover operating knob detection switch 18 is subsequently detected as off (S107), this is an erroneous situation and an alarm is given (S108) by a display indicating the erroneous operation or indicating that the movable light shield cover 4 is open, on the display unit 35, and by alarm sound from the sound generating device 36.

Then a timer T in the control unit 32 starts time counting (S109), and the motor driver 39 drives the film feeding motor 28 in a direction to push the film 5 out of the cartridge 1 (S110), whereby the power transmitting means 27 transmits the driving force of the motor 28 to the power transmitting fork 24 and the film 5 in the cartridge 1 comes out through the movable light shield cover 4. When the film 5 passes in front of the film detecting photoreflector 25, a phototransistor therein detects a variation in the reflectance of the light emitting from a light-emitting diode provided in the above-mentioned photoreflector 25, whereby the control unit 32 detects that the film 5 has passed in front of the photoreflector 25 (S112). In case of no detection, the sequence returns to the step S110 to continue the film advancement.

On the other hand, upon arrival of the count of the timer T at a predetermined value $T_o$ (S111), if the photoreflector 25 does not detect the film 5 (S112), there exists a failure and the sequence proceeds to a step S125 to cause the motor driver 39 to reverse the motor 28, thereby rewinding the film 5. More specifically the motor driver 39 drives the film feeding motor 28 in the reverse direction, thereby rotating the fork 24 in the reverse direction through the power transmitting means 27 and feeding the film 5 in a direction toward the cartridge 1.

Since the fork 24 and the spool 26 are given different film advancing speeds by the power transmitting means 27, the film 5, once taken up on the spool 26, is advanced faster than when advanced by the fork 24 only. Then there is discriminated whether the photoreflector 25 detected the perforation of a first frame among those 6a, 6b, 6c, 6d on the film 5 (S113), and, upon detection, the motor driver 39 stops the film feeding motor 28 (S114) whereupon the first frame of the film 5 is brought to the proper position.

Then there is discriminated whether the switch SW1 (30) has been turned on by the actuation of the unrepresented shutter release button (S115). When said switch SW1 (30) is turned on, the phototaking control circuit 37 executes the operations of distance measurement, light metering etc. prior to the opening of the shutter (S116). Then there is discriminated whether the switch SW2 (31) has been turned on by the actuation of the unrepresented shutter release button (S117). When the switch SW2 (31) is turned on, the phototaking control circuit 37 opens the unrepresented shutter and closes it after the lapse of a predetermined time (S118).

Then the timer T of the control unit 32 starts time counting operation again (S119), and the motor driver 39 drives the film feeding motor 28 in the forward direction (S120). If the count of the timer T exceeds a predetermined value $T_1$ (S121), indicating that the film 5 cannot be pulled out from the cartridge 1, the sequence proceeds to the step S125 for rewinding the film 5. On the other hand, if the photoreflector 25 detects that the film 5 has been advanced by a frame (S122) before the count of the timer T reaches the predetermined value $T_1$, the motor driver 39 deactivates the film feeding motor 28 (S123).

Subsequently there is discriminated, by an already known method, whether the number of already phototaken frames corresponds to a predetermined value (last frame) (S124), and, in case of coincidence with the last frame, indicating that all the frames of the film 5 are used, the sequence proceeds to the step S125 to rewind the film 5. Otherwise the sequence returns to the step S115 and enters again the stand-by state for the phototaking operation.

When the film rewinding is started in the step S125, there is discriminated whether the film 5 is present in front of the photoreflector 25 (S126), and, when the film 5 becomes absent, the timer T again starts the time counting operation (S127). Then, when the count of the timer T exceeds a predetermined value $T_2$ (S128), the motor driver 39 deactivates the film feeding motor 28, thereby terminating the film rewinding (S129). The above-mentioned value $T_2$ corresponds to a time sufficient for the film 5 to be rewound into the cartridge 1 after passing in front of the photoreflector 25. The value $T_2$ may be varied according to the voltage condition of the battery 33 and the ambient temperature of the camera, in order to avoid wasteful rotation of the motor 28.

Then the motor driver 38 starts to drive the motor 21 for opening and closing the movable light shield cover in a direction opposite to that in the step S104, namely in the closing direction of the movable light shield cover (S130), whereupon the power transmitting means 20 at first closes the movable light shield cover 4 and then causes the retracting finger 12 to engage the rear cover operating member 13 with the rear cover operating knob 16.

Subsequently there is discriminated whether the movable light shield cover detection switch 10 has been turned off (S131), and, if not, the sequence returns to the step S130, but, if off, the motor driver 38 deactivates the above-mentioned motor 21 (S132).

In this state the display unit 35 provides a display indicating that the cartridge 1 can be taken out from the camera body or that the movable light shield cover 4 is closed (S131).

In the above-explained embodiment, since the operating knob 16 for the rear cover of the cartridge chamber is disengaged from the rear cover operating member 13 while the movable light shield cover 4 of the film cartridge 1 loaded in the camera is open, there can be prevented the trouble of damage to the film by the closing of the movable light shield cover 4, without eventual destruction of the rear cover operating knob 16 or the rear cover operating member 13.

In the following there will be explained a second embodiment of the present invention, with reference to a flow chart shown in FIGS. 4A and 4B.

Since the present embodiment is different from the foregoing first embodiment, only in a part of the flow chart shown in FIGS. 3A and 3B, such different points alone will be explained in the following, with reference to FIGS. 4A and 4B. The foregoing explanation in relation to FIGS. 1 and 2 are applicable to other parts, and, in FIGS. 4A and 4B, steps same as those in FIGS. 3A and 3B are given same step numbers and will not be explained again.

The present embodiment is to prevent erroneous operations when the battery 33 is replaced or when the power supply is turned on, in a state in which the cartridge 1 is already loaded in the camera body.

Referring to FIG. 4A, when the battery 33 is loaded in the camera body, a voltage detection circuit in the control unit 32 discriminates whether power supply voltage is enough for the function of the control unit 32 (S201). The same operation is conducted also when an unrepresented main switch is turned on. If the power supply voltage is acceptable, the photoreflector 25 discriminates whether the film 5 has been extracted from the cartridge 1 prior to the replacement of the battery 33 (S202), and, if extracted, the sequence skips steps S204 to S112 and proceeds to a step S113. On the other hand, if the film 5 has not been extracted from the cartridge 1, there is discriminated whether the movable light shield cover detection switch 10 has been turned on, indicating that the cartridge 1 has been loaded in the camera body and the movable light shield cover 4 has been opened prior to the battery replacement (S204), and, if already open, the sequence skips steps S102 to S106 and proceeds to a step S107.

The embodiment explained above allows to prevent erroneous operations, by detecting the states of the movable light shield cover and of the film when the power supply of the camera is turned on.

Figure 5:
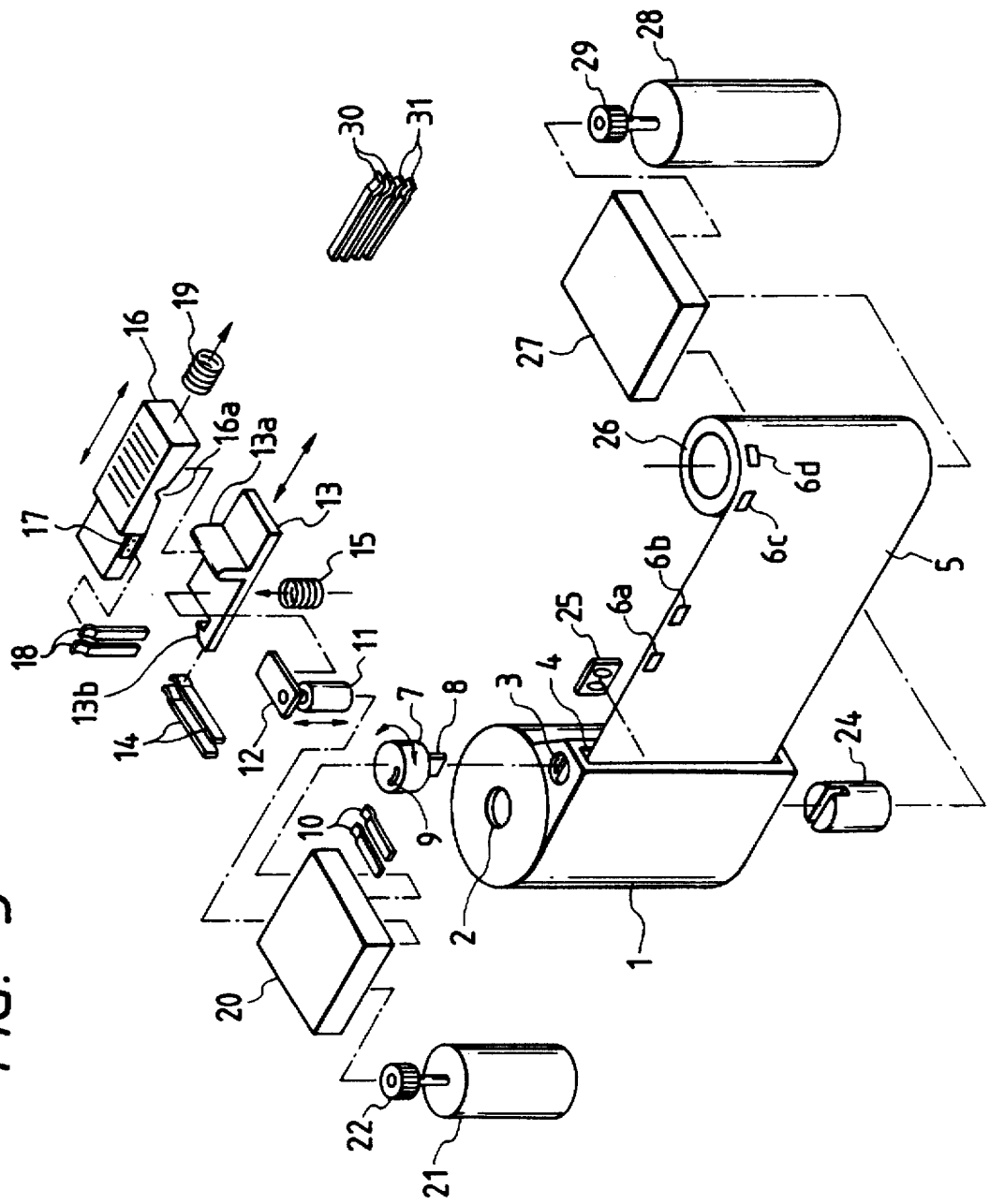
FIG. 5 is an exploded perspective view of principal parts of a camera constituting a third embodiment of the present invention.
Figure 6:
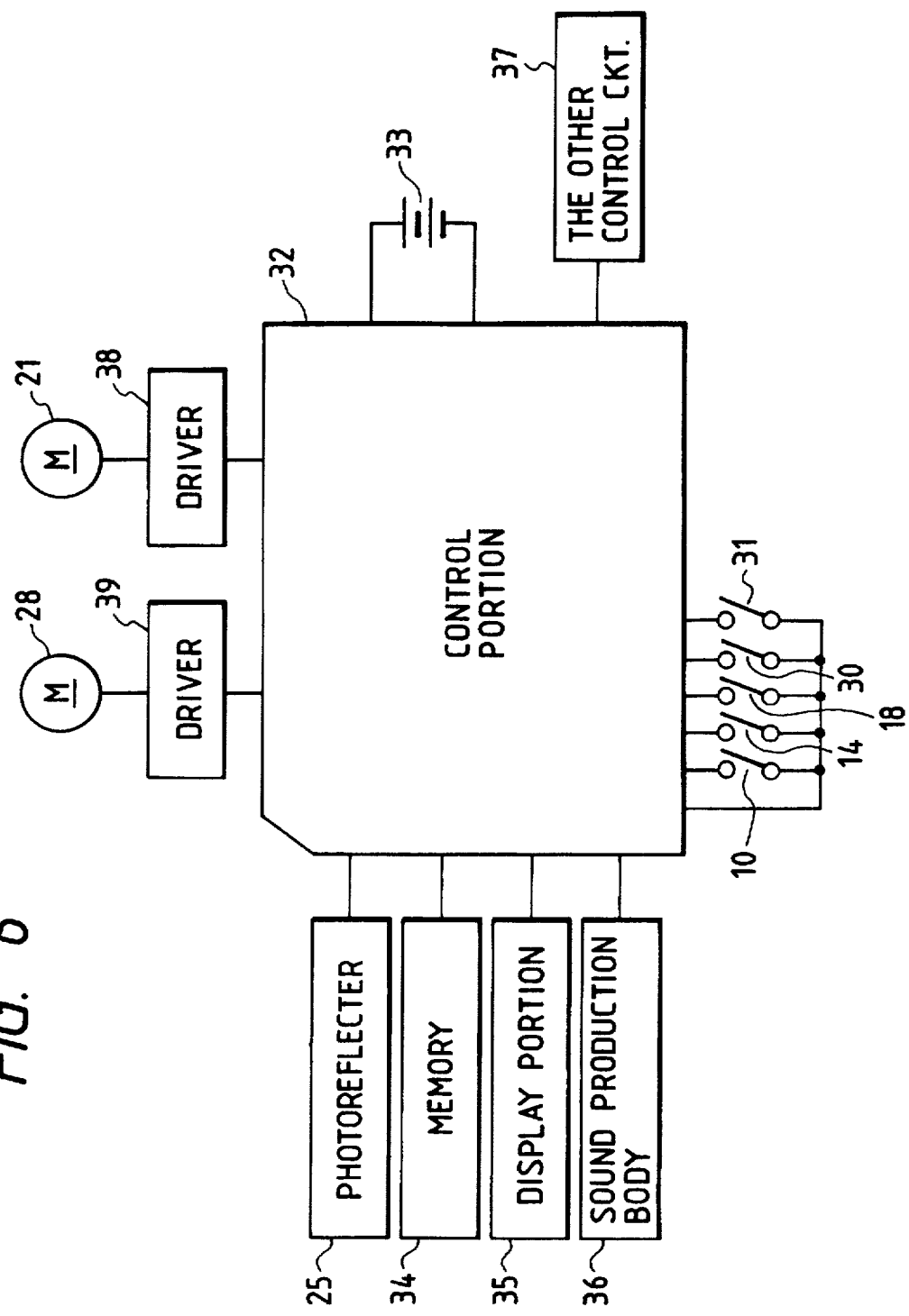
FIG. 6 is a block diagram of electrical circuits of the camera shown in FIG. 5.

FIGS. 5, 6, 7A and 7B illustrate a third embodiment of the present invention, wherein FIGS. 5 and 6 respectively correspond to and are same as FIGS. 1 and 2 except for the cartridge detection switch 23. Consequently components same as those in FIGS. 1 and 2 are represented by same numbers and will not be explained further in the following.

Figure 4B:
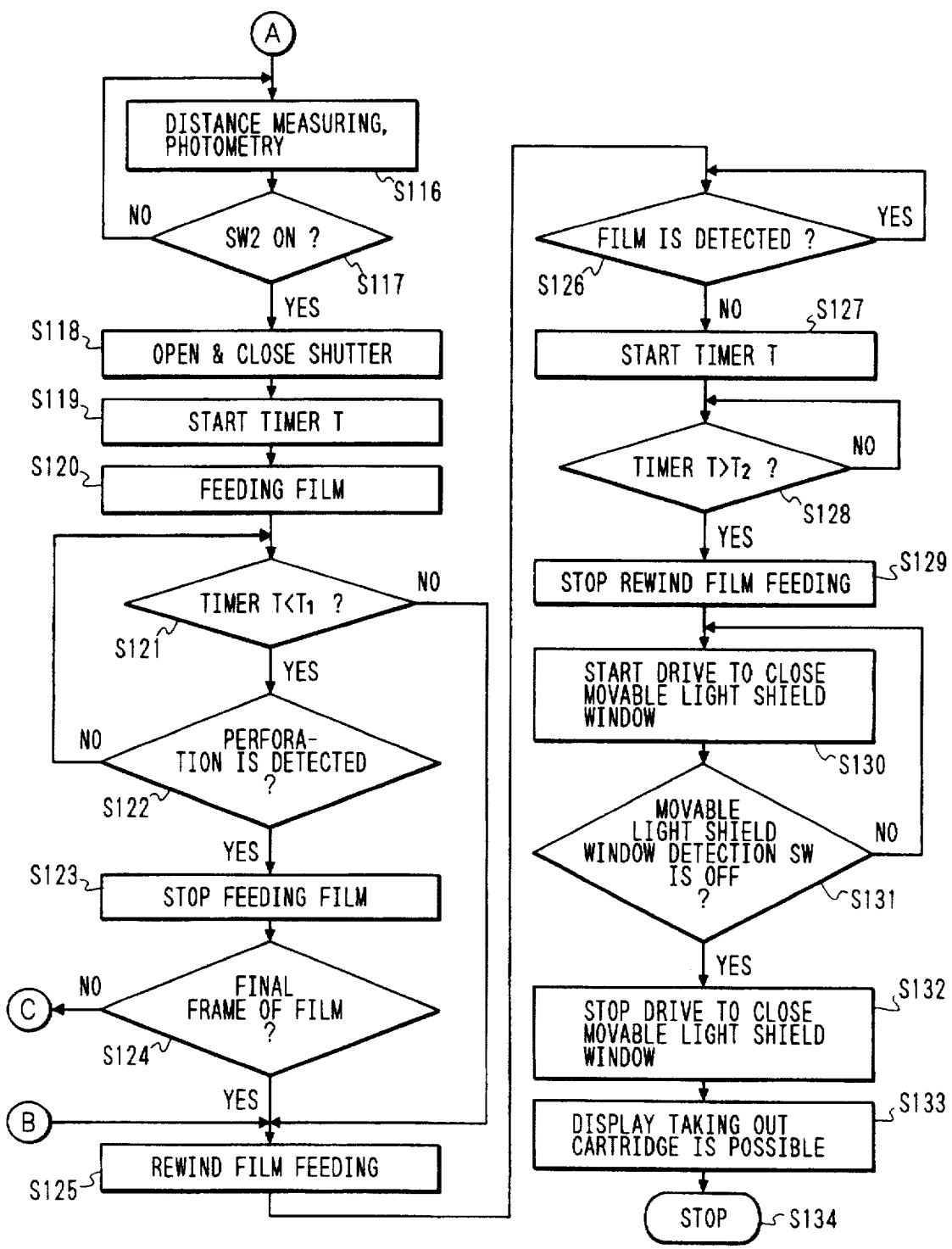
FIG. 4 is comprised of FIGS. 4A and 4B illustrating flow charts showing the control sequence of a second embodiment of the present invention.
Figure 7B:
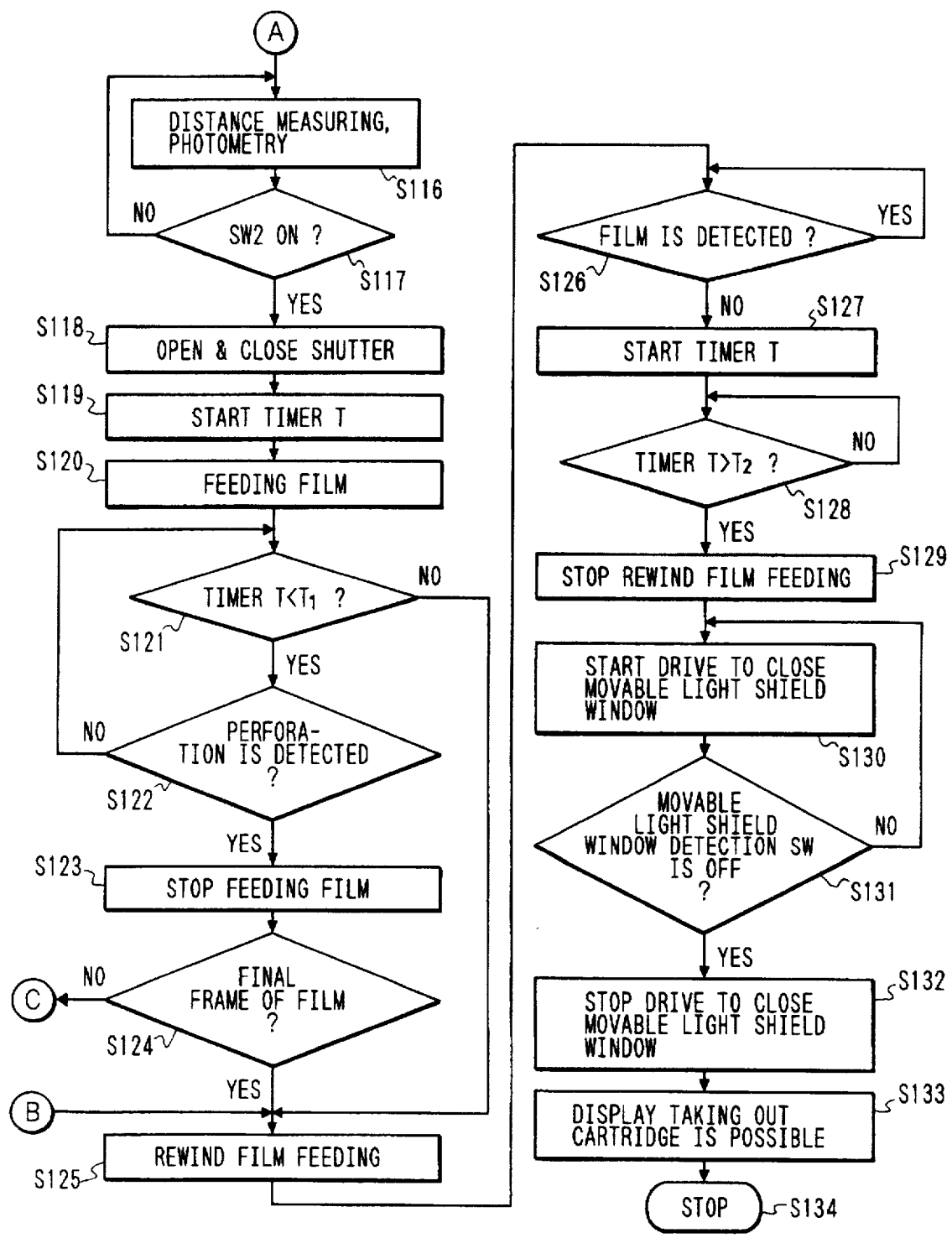
FIG. 7 is comprised of FIGS. 7A and 7B illustrating flow charts showing the control sequence of a control unit shown in FIG. 6.

Also FIGS. 7A and 7B correspond to FIGS. 4A and 4B, and steps in FIGS. 7A and 7B, same as those in FIGS. 4A and 4B are given same step numbers and will not be explained again. In fact the sequence shown in FIGS. 7A and 7B are different from that shown in FIGS. 4A and 4B, only in the step S301, which will be explained in the following.

In the present embodiment, the cartridge detection switch 23 is eliminated, and, at the loading of the cartridge 1 into the camera body, the sequence is started after the rear cover locking detection switch 14 is turned off (S301) and then turned on again (S103). Namely, the turn-off and on in succession of the rear cover locking detection switch mean the opening and closing of the rear cover of the cartridge chamber, and these operations are regarded as the cartridge loading operation.

The embodiment explained above allows to dispense with the switch for detecting the loading of the cartridge 1, as the loaded state of the cartridge is identified by the opened state of the movable light shield cover 4 and the loading operation of the cartridge 1 into the camera is identified by the opening and closing of the cartridge chamber.

In the following there will be explained a fourth embodiment of the present invention, with reference to a flow chart shown in FIGS. 8A and 8B.

Since the present embodiment is different, from the foregoing first embodiment, only in a part of the flow chart shown in FIGS. 3A and 3B, such different points alone will be explained in the following, with reference to FIGS. 8A and 8B. The foregoing explanation in relation to FIGS. 1 and 2 are applicable to other parts, and, in FIGS. 8A and 8B, steps same as those in FIGS. 3A and 3B are given same step numbers and will not be explained again.

Figure 8B:
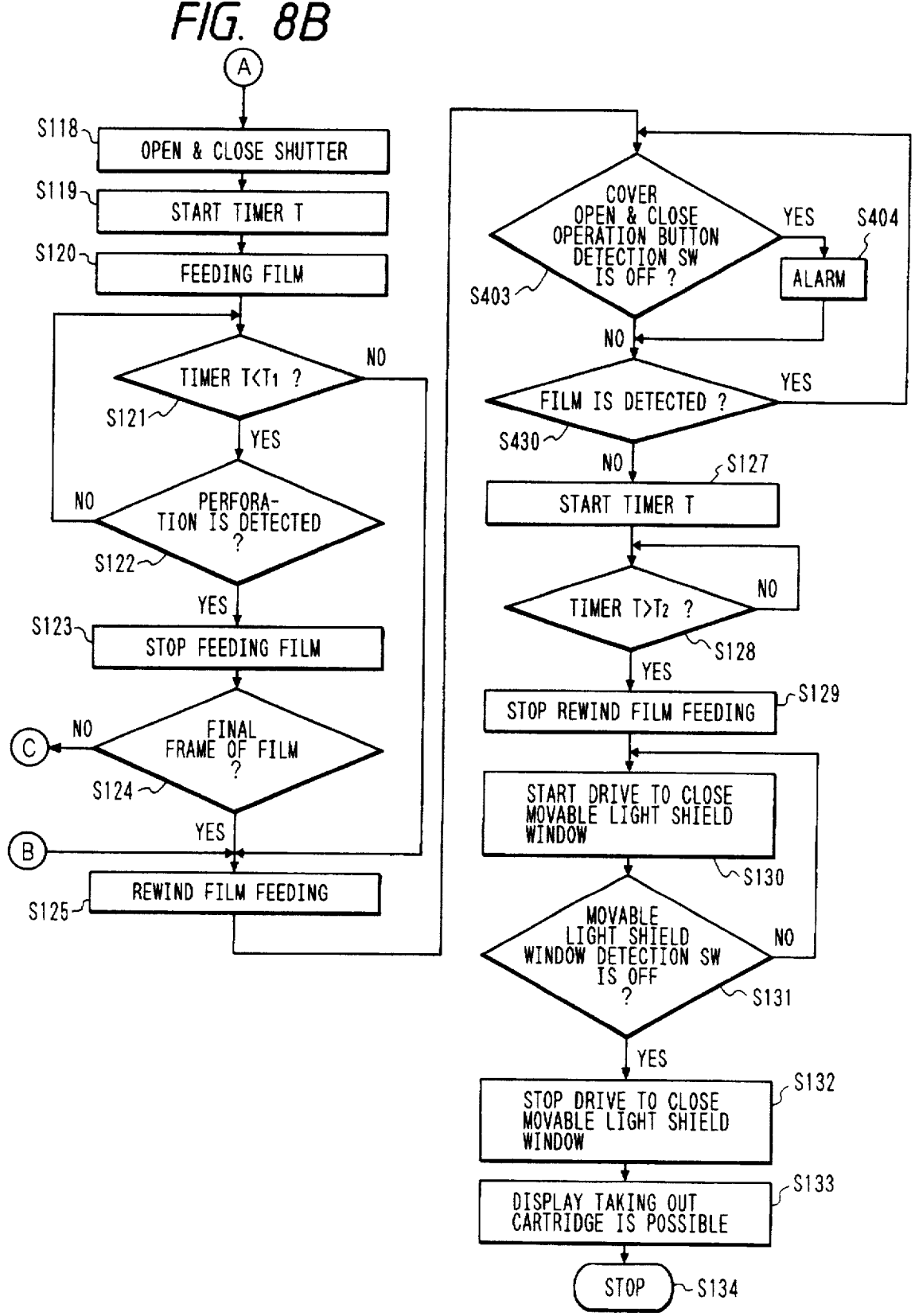
FIG. 8 is comprised of FIGS. 8A and 8B illustrating flow charts showing the control sequence of a fourth embodiment of the present invention.

The flow chart shown in FIGS. 8A and 8B are different in two points from the first embodiment. The first difference lies in steps S401 and S402 in which, during the detection for the turning-on of the switch SW1 (30), if the rear cover operating knob 16 is manipulated for opening the rear cover, thereby turning off the rear cover operating knob detection switch 18, alarm is given by the display unit 35 and the sound generating device 36. The second difference lies in steps S403 and S404 in which, during the detection of the film 5 by the photoreflector 25 in the film rewinding into the cartridge 1, if the rear cover operating knob 16 is manipulated for opening the rear cover, thereby turning off the rear cover operating knob detection switch 18, alarm is given in a similar manner as explained above.

In the embodiment explained above, if the knob 16 for operating the rear cover of the cartridge chamber is manipulated to open the rear cover while the movable light shield cover of the cartridge 1 loaded in the camera is open, alarm is generated to inform the user of the erroneous operation, thereby preventing such erroneous operation.

FIGS. 9, 10, 11A, 11B and 11C illustrate a fifth embodiment of the present invention, respectively corresponding to FIGS. 1, 2, 3A and 3B.

Figure 9:
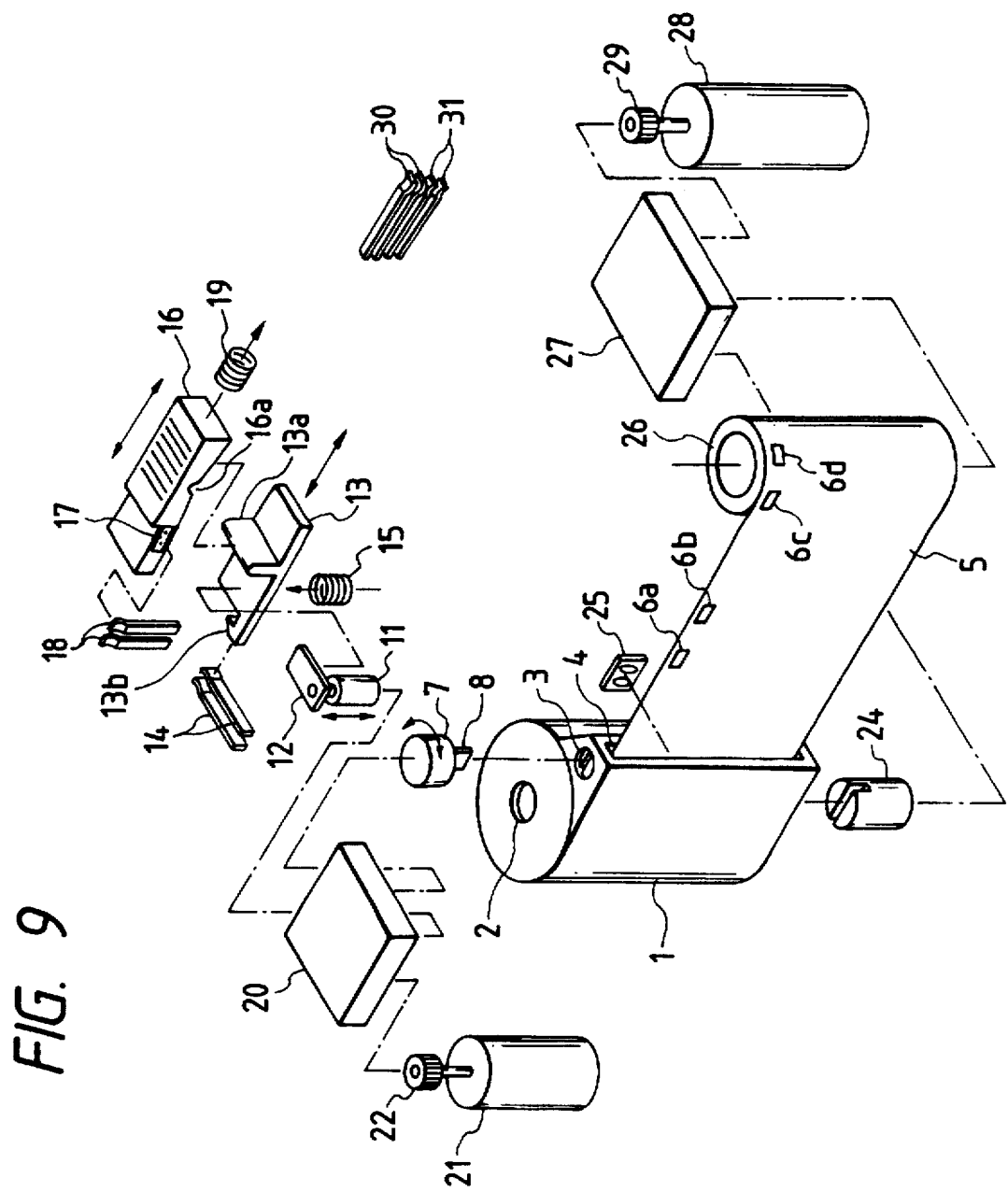
FIG. 9 is an exploded perspective view of principal parts of a camera constituting a fifth embodiment of the present invention.
Figure 10:
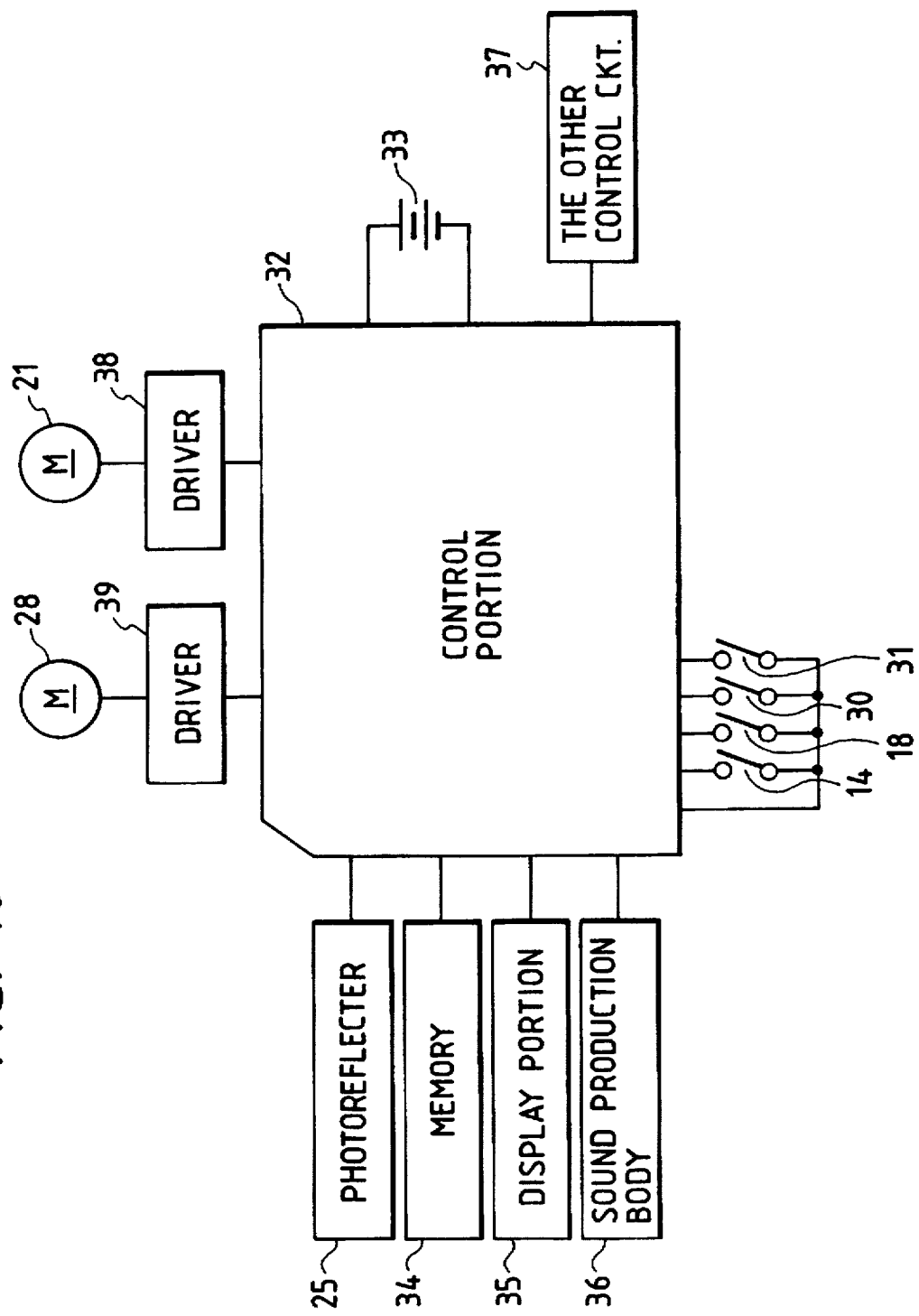
FIG. 10 is a block diagram of electrical circuits of the camera shown in FIG. 9.
Figure 11B:
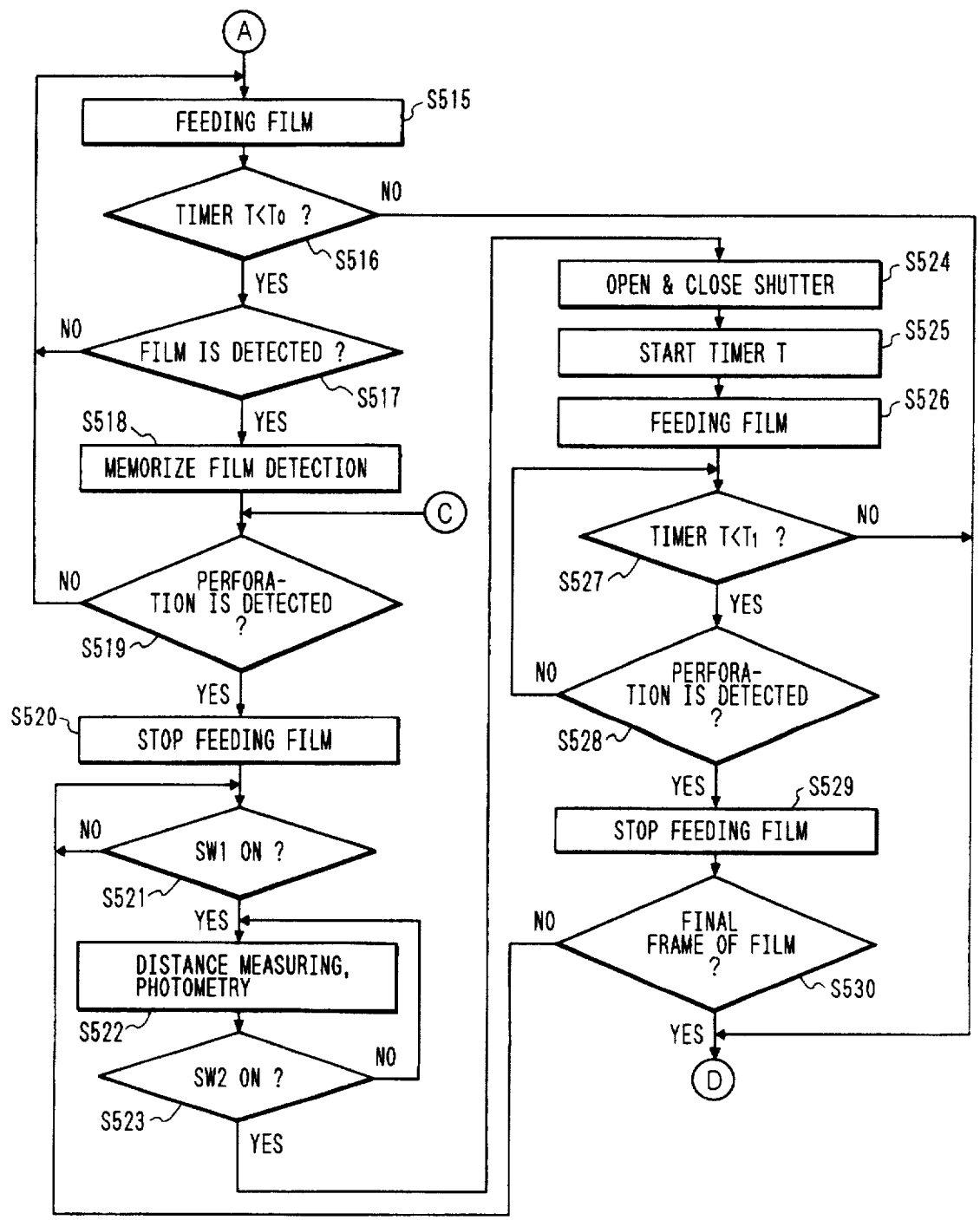
FIG. 11 is comprised of FIGS. 11A to 11C illustrating flow charts showing the control sequence of the fifth embodiment.
Figure 11C:
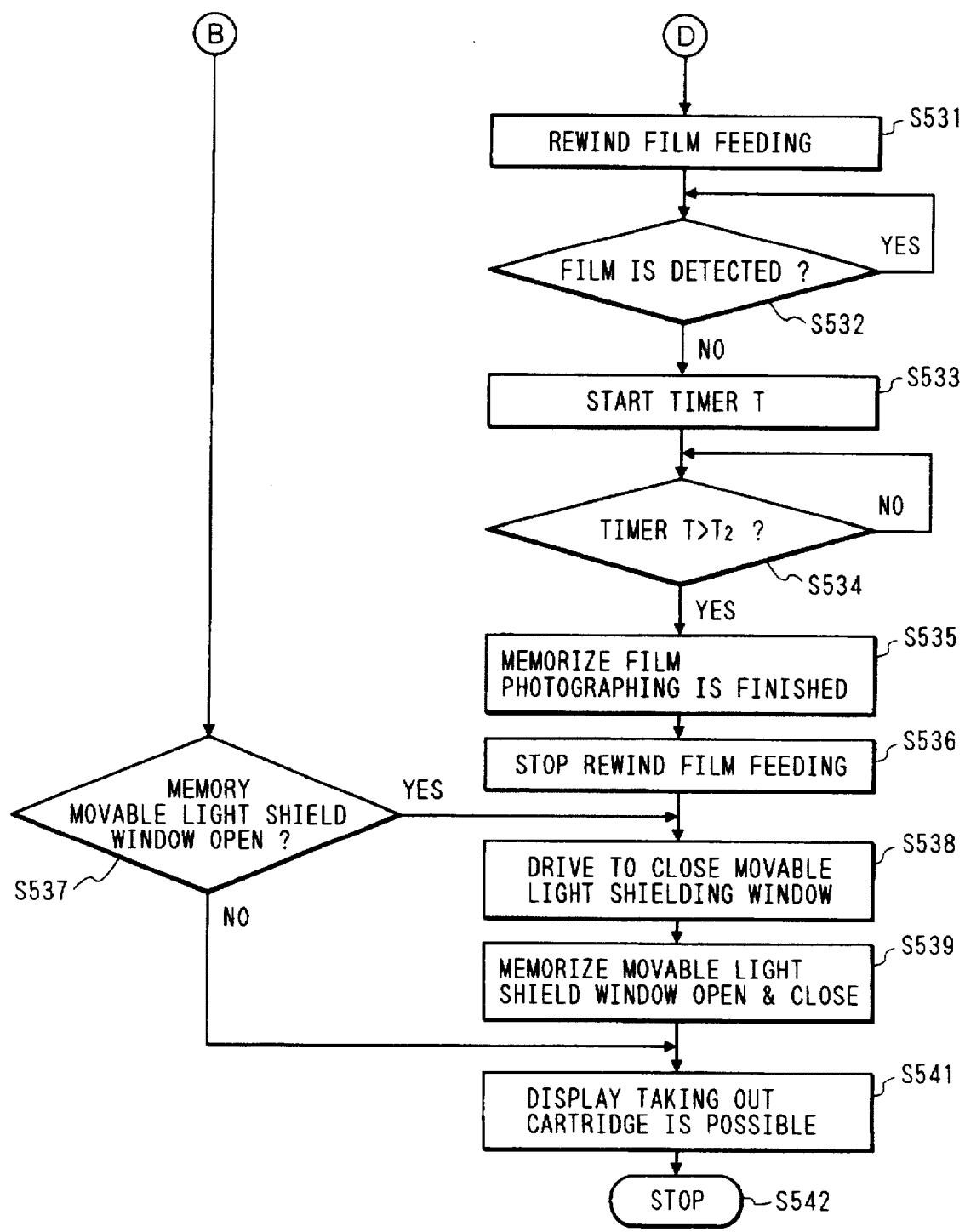

The configurations shown in FIGS. 9 and 10 are different from those shown in FIGS. 1 and 2 in that the movable light shield cover detection switch 10, the electrode piece 9 and the cartridge detection switch 23 shown in FIGS. 1 and 2 are eliminated. As other components in FIGS. 9 and 10 are same as those in FIGS. 1 and 2, they are given same numbers as in FIGS. 1 and 2 and will not be explained further.

The present embodiment is different in the elimination of the movable light shield cover detection switch 10, by memorizing facts that "the film 5 is already exposed", "the film 5 is extracted from the cartridge" and "the movable light shield cover 4 is open" in the non-volatile memory 34. In the following there will be explained the different points alone from the above-mentioned first embodiment, with reference to a flow chart shown in FIGS. 11A to 11C.

After the start of the sequence (S501), when the battery 33 is loaded into the camera body, the voltage detection circuit of the control unit 32 discriminates whether the power supply voltage is enough for the functions of the control unit 32 (S502). A same operation is conducted also when the turning-on of an unrepresented main switch is detected. Then there is checked information indicating that all the film frames are phototaken, to be stored in the non-volatile memory 34 in a step S535 (S503), and, if the film 5 has been exposed to the last frame, the sequence proceeds to a step S537. The step S537 similarly checks information on the closing of the movable light shield cover, to be stored in the non-volatile memory 34 in a step S539, and, if the movable light shield cover 4 is open, the motor driver 38 drives the motor 21 in a direction to close the movable light shield cover 4 (S538). Then the closing operation is memorized (S539), and the retracting finger 12 is made to engage with the rear cover operating knob 16 (S540). Subsequently the display unit 35 provides a display indicating that the cartridge 1 is removable from the camera body or the movable light shield cover 4 is closed (S541).

On the other hand, if the step S503 identifies that the film 5 has not been exposed to the last frame, there is checked information on the film detection, to be stored in the non-volatile memory 34 in a step S518 (S504), and, if the film 5 is extracted from the cartridge 1, the sequence proceeds to a step S519. If the film 5 has not been extracted from the cartridge 1, there is checked information for the opened state of the movable light shield cover, to be memorized in the non-volatile memory 34 in a step S511 (S505), and, if it is open, the sequence proceeds to a step S512. If not, there is discriminated whether the photoreflector 25 detects the film 5 (S506), and, if the film 5 is detected, the sequence proceeds to a step S519. If the film 5 is not detected, there is detected that the rear cover locking detection switch 14 is once turned off and then is turned on (S507, S508). Such situation that the rear cover locking detection switch 14 is once turned off and is then turned on means that the rear cover of the cartridge chamber is once opened and is then closed, and is regarded as the cartridge loading operation. Subsequently the motor driver 38 drives the motor 21 in a direction to open the movable light shield cover 4, whereby the power transmitting means 20 causes the retracting gear 11 to move the retracting finger 12 in a direction to disengage the rear cover operating member 13 from the rear cover operating knob 16 (S509), and thereafter drives the driving members 7 in a direction to open the movable light shield cover 4 through the finger 8 and the engaging part 3 (S510). Then the opening operation of the movable light shield cover 4 is memorized in the non-volatile memory 34 (S511).

If the rear cover operating knob detection switch 18 is subsequently detected as off (S512), this is an erroneous situation and an alarm is given (S513) by a display indicating the erroneous operation or indicating that the movable light shield cover 4 is open, on the display unit 35, and by alarm sound from the sound generating device 36.

If such off-state of the rear cover operating knob detection switch 18 is not detected, the timer T in the control unit 32 starts the counting operation (S514), and the motor driver 39 drives the film feeding motor 28 in a direction to push the film 5 out of the cartridge 1 (S515). Then there is discriminated whether the count of the timer T has exceeded a predetermined value $T_o$, and if the film 5 cannot be detected when the count exceeds the predetermined value $T_o$, there exists a failure and the sequence proceeds to a step S531 in which the motor driver 38 reverses the motor 28 to rewind the film 5.

In the proper feeding of the film 5, it comes out of the cartridge 1 through the movable light shield cover 4, by means of the power transmitting fork 24. When the film 5 passes in front of the photoreflector 25, the phototransistor therein detects the variation in reflectance of the light emitted from the light-emitting diode in the photoreflector 25, whereby the control unit 32 detects the passing of the film 5 in front of the photoreflector 25 (S517). This detection is memorized in the non-volatile memory 34 (S518). Since the fork 24 and the spool 26 are given different film advancing speeds by the power transmitting means 27, the film 5, once taken up on the spool 26, is advanced faster than when advanced by the fork 24 only.

Subsequently the photoreflector 25 detects the perforation of the first frame, among those 6a, 6b, 6c, 6d on the film 5 (S519), and the motor driver 39 deactivates the film feeding motor 28 (S520) whereupon the first frame of the film 5 is brought to the proper position.

Then there is discriminated whether the switch SW1 (30) has been turned on by the actuation of the unrepresented shutter release button (S521). When said switch SW1 (30) is turned on, the phototaking control circuit 37 executes the operations of distance measurement, light metering etc. prior to the opening of the shutter (S522). Then there is discriminated whether the switch SW2 (31) has been turned on by the actuation of the unrepresented shutter release button (S523). When the switch SW2 (31) is turned on, the phototaking control circuit 37 opens the unrepresented shutter and closes it after the lapse of a predetermined time (S524).

Then the timer T of the control unit 32 starts time counting operation again (S525), and the motor driver 39 drives the film feeding motor 28 in the forward direction (S526). Subsequently there is discriminated whether the count of the timer T has exceeded a predetermined value $T_1$ (S527), and, if the predetermined value has been exceeded, indicating that the film 5 cannot be pulled out from the cartridge 1, the sequence proceeds to a step S531 to rewind the film 5. On the other hand, if the photoreflector 25 detects that the film 5 has been advanced by a frame (S528) before the count of the timer T reaches the predetermined value $T_1$, the motor driver 39 deactivates the film feeding motor 28 (S529).

Subsequently there is discriminated, by an already known method, whether the number of already exposed frames corresponds to a predetermined value (S530), and, in case the predetermined value is reached, indicating that all the frames on the film 5 are exposed, the sequence proceeds to the step S531 to rewind the film 5. Otherwise the sequence returns to the step S521 and enters again the stand-by state for the phototaking operation.

When the film rewinding operation is started in the step S531, there is discriminated whether the film 5 is present in front of the photoreflector 25 (S532), and, when the film 5 becomes absent, the timer T again starts the time counting operation (S533). Then, when the count of the timer T exceeds a predetermined value $T_2$ (S534), the non-volatile memory 34 memorizes that all the frames of the film 5 have been exposed (S535), and the motor driver deactivates the film feeding motor 28 (S536) thereby terminating the film rewinding operation. The above-mentioned value $T_2$ corresponds to a time sufficient for the film 5 to be rewound into the cartridge 1 after passing in front of the photoreflector 25. The value $T_2$ may be varied according to the voltage condition of the battery 33 and the ambient temperature of the camera, in order to avoid wasteful rotation of the motor 28.

Then the motor driver 38 starts to drive the motor 21 for opening and closing the movable light shield cover in a direction opposite to that in the step S510, namely in the closing direction of the movable light shield cover (S538), whereupon the power transmitting means 20 at first closes the movable light shield cover 4 and then causes the refracting finger 12 to engage the rear cover operating member 13 with the rear cover operating knob 16.

Subsequently the non-volatile memory 34 memorizes that the movable light shield cover 4 has been closed, and the display unit 35 provides a display indicating that the cartridge 1 is removable from the camera body or that the movable light shield cover 4 is in the closed state (S541).

The embodiment explained above can prevent erroneous operations and can increase the speed of operations after the main switch is turned on or after the battery replacement, by storing the state of the movable light shield cover or whether the film has been extracted from the cartridge 1, in the non-volatile memory 34.

Further, If a main switch off or a battery exchange is not considered, an usual memory can be also used instead of the non-volatile memory 34. Although the usual memory is used, it can be dealt with the main switch off or the battery exchange if a back-up supplying power is performed.

In the following there will be explained a sixth embodiment of the present invention. Since the present embodiment is different from the foregoing first embodiment only in a part of the configurations shown in FIGS. 1 and 2, such different points alone will be explained in the following, with reference to FIGS. 12 and 13. Consequently, in FIGS. 12 and 13, components same as those in FIGS. 1 and 2 are represented by same numbers, and will not be explained further. Also the control sequence will not be explained, since the flow chart in FIGS. 3A and 3B are applicable also to this embodiment.

In this embodiment, the operating member for the movable light shield cover and the state detecting member therefor engage with the cartridge in mutually different positions, whereby the opening or closing of the movable light shield cover can be securely detected even if it generates distortion such as twisting at the opening or closing operation.

Figure 12:
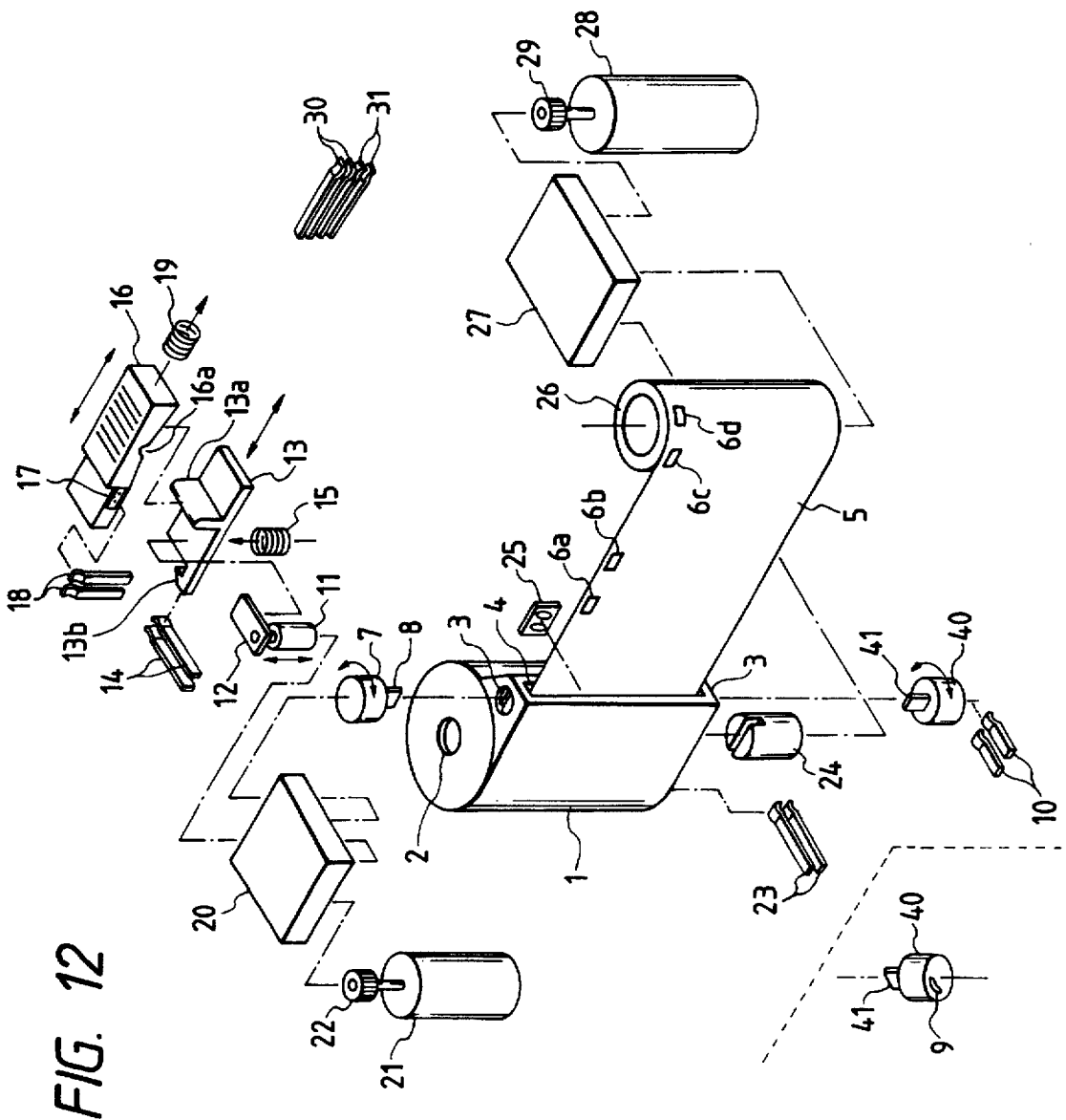
FIG. 12 is an exploded perspective view of principal parts of a camera constituting a sixth embodiment of the present invention.
Figure 13:
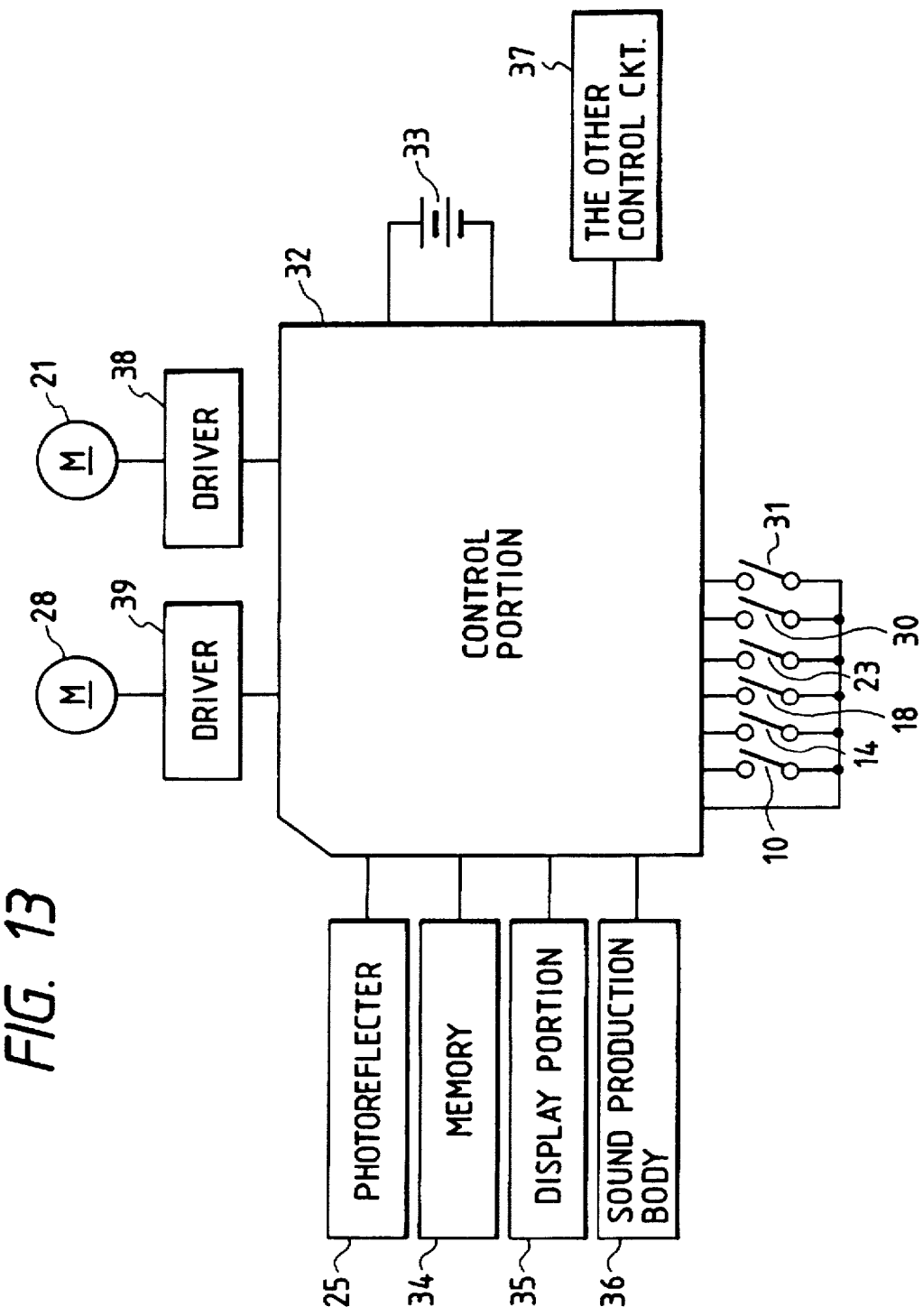
FIG. 13 is a block diagram of electrical circuits of the camera shown in FIG. 12.

Referring to FIGS. 12 and 13, there are shown a member 40 for detecting the state of the movable light shield cover, adapted to rotate following the rotation of the engaging part 3 for opening or closing the movable light shield cover 4; an engaging projection 41 of the detecting member 40; an electrode piece 9 formed as an arc around the rotary axis of the detecting member 40; and a switch 10 for detecting the state of the movable light shield cover, to be closed by the electrode piece 9. In the illustrated open state of the movable light shield cover 4, the detecting switch 10 is turned on.

The embodiment explained above can securely ensure the operation of the movable light shield cover 4, since the state thereof is judged by the state of the detecting member 40 which follows the opening or closing operation of the movable light shield cover 4 of the cartridge 1 loaded in the camera.

In the following there will be explained a seventh embodiment of the present invention, with reference to a flow chart shown in FIGS. 14A and 14B.

Since this embodiment is different, from the foregoing first or sixth embodiment, only in a part of the flow chart of the first embodiment shown in FIGS. 3A and 3B, such different points alone will be explained in the following, with reference to FIGS. 14A and 14B. To other parts, the foregoing explanation on the first embodiment in FIGS. 2 to 3B or that on the sixth embodiment in FIGS. 12 and 13 is applicable, and, in FIGS. 14A and 14B, steps same as those in FIGS. 3A and 3B are given same step numbers and will not be explained again.

Figure 14A:
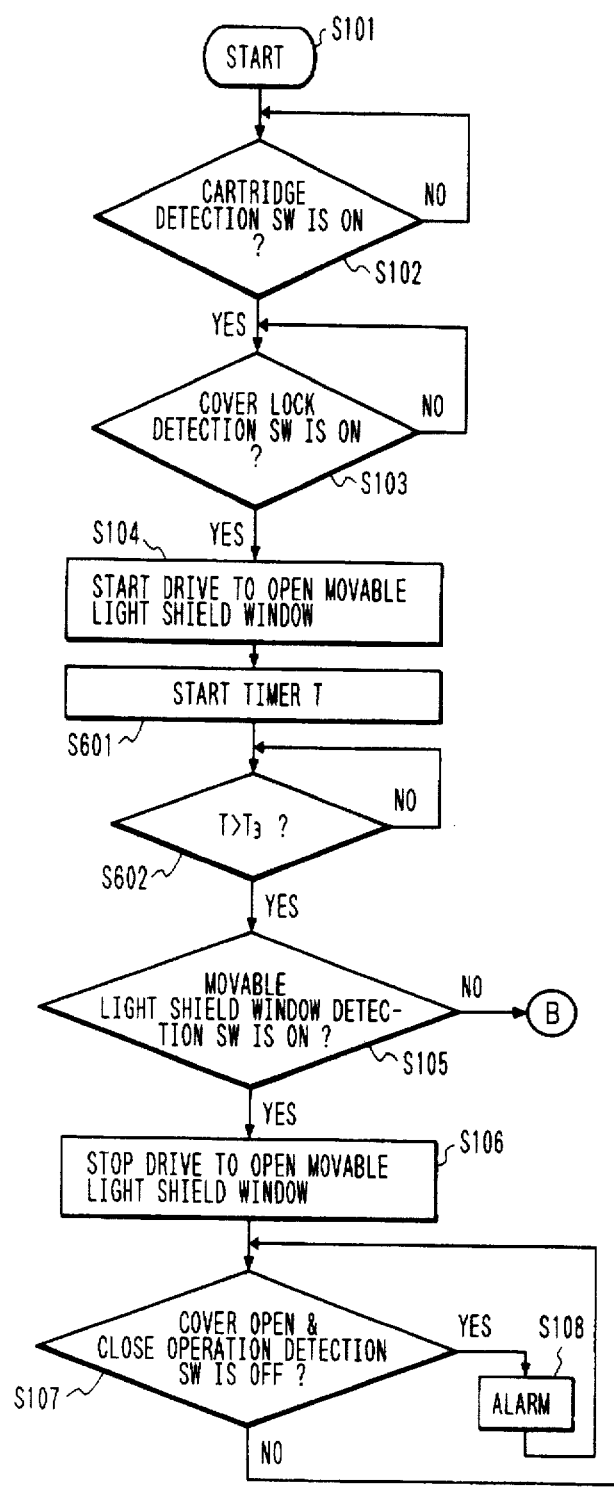
FIG. 14 is comprised of FIGS. 14A and 14B illustrating flow charts showing the control sequence of a seventh embodiment of the present invention.
Figure 14:
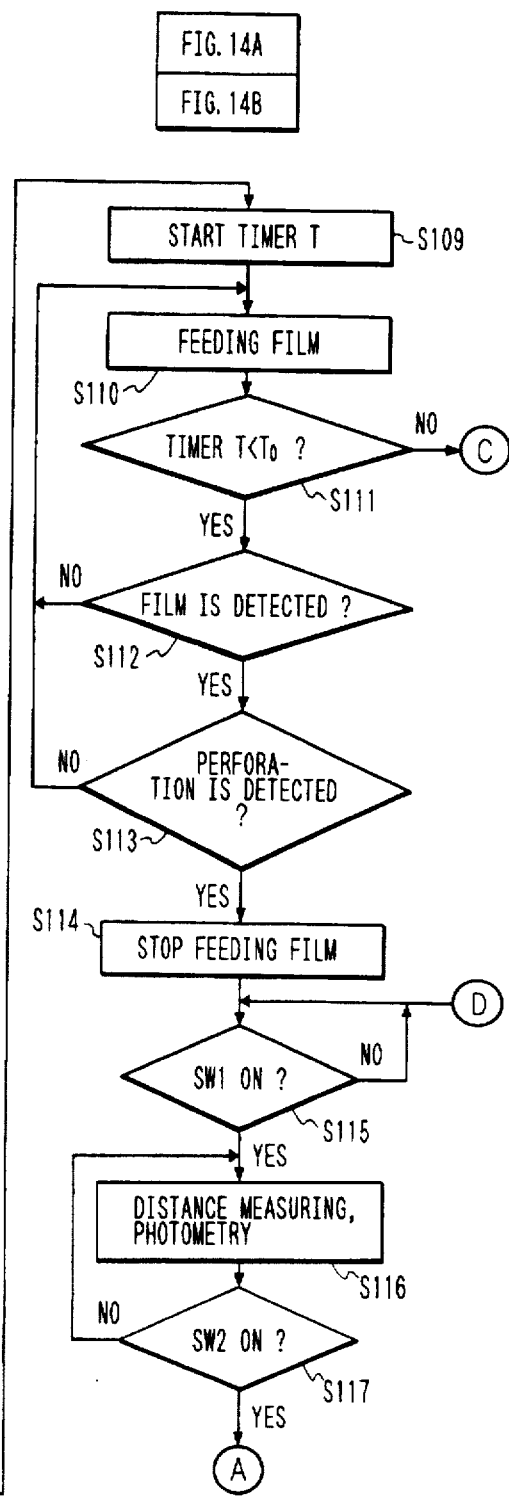
Figure 14B:
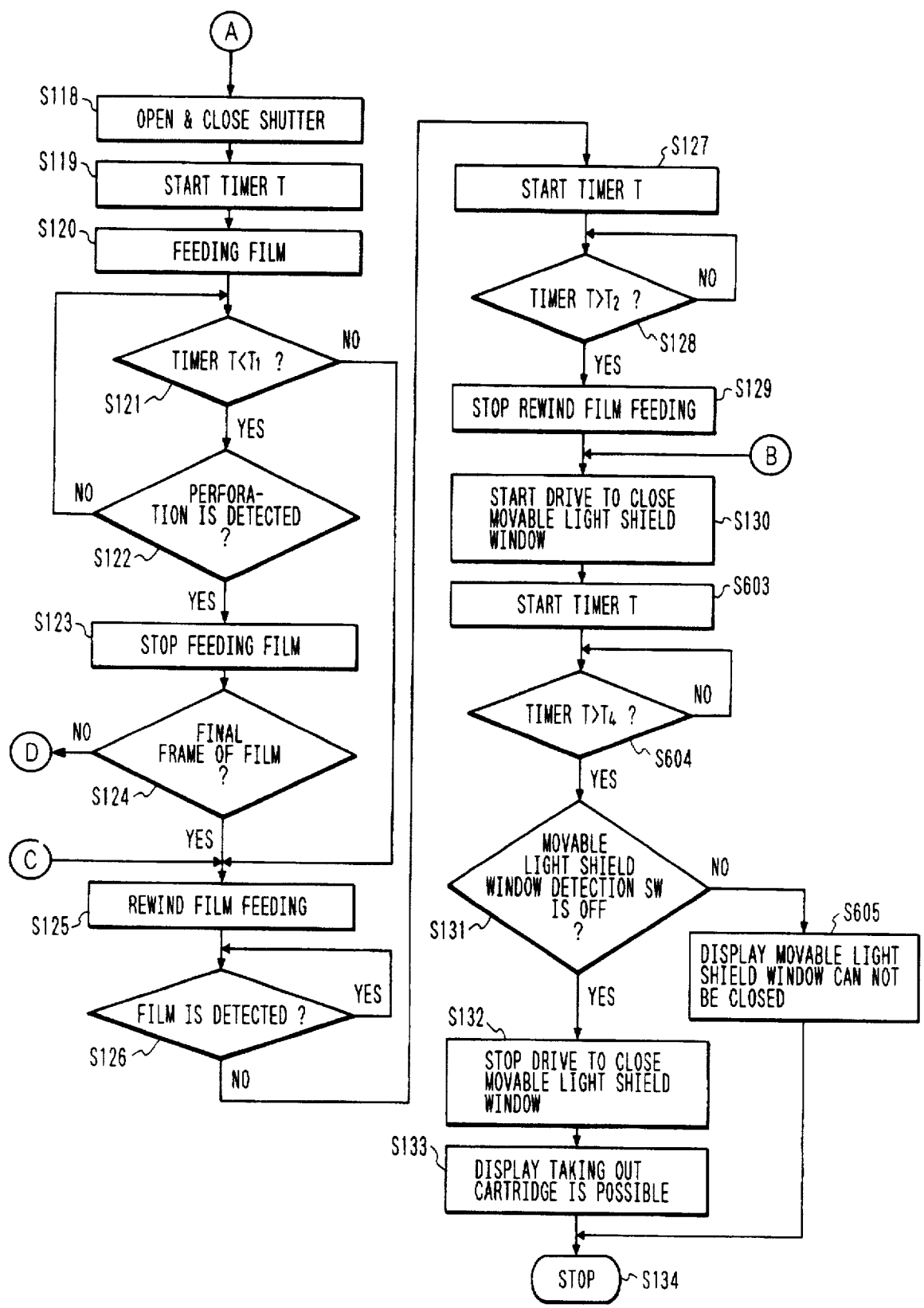

Referring to FIGS. 14A and 14B, the motor 21 is energized to open the movable light shield cover 4 through the driving member 7 in a step S105. However, if the movable light shield cover 4 cannot be opened by a failure, the timer T is started (S601). After the lapse of a time $T_3$ sufficient for opening the movable light shield cover 4 (S602), there is discriminated the state of the movable light shield cover detecting switch 10 (S105), and, if it is off, the sequence proceeds to a step S130 as a failure may exist. The step S130 rotates the driving member 7 in the reverse direction to close the movable light shield cover 4, and the timer T is started (S603). After the lapse of a time $T_4$ sufficient for closing the movable light shield cover 4 (S604), there is discriminated, by the detecting switch 10, whether the movable light shield cover 4 has been closed (S131). If it is not closed, such non-closed situation is informed to the user by the display unit 35 and the sound generating device 36.

The embodiment explained above identifies a failure in case the opening or closing operation of the movable light shield cover 4 of the cartridge 1 loaded in the camera is not completed after the lapse of a predetermined time, so that an appropriate countermeasure for the failure can be taken.

Figure 15:
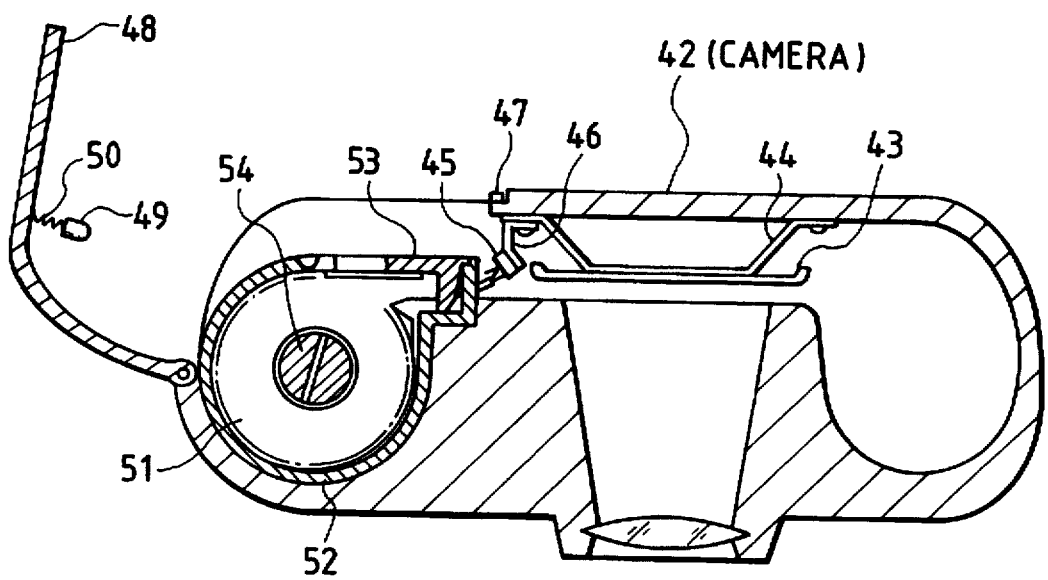
FIG. 15 is a horizontal cross-sectional view of a camera constituting an eighth embodiment of the present invention, in which the movable light shield cover is closed.
Figure 16:
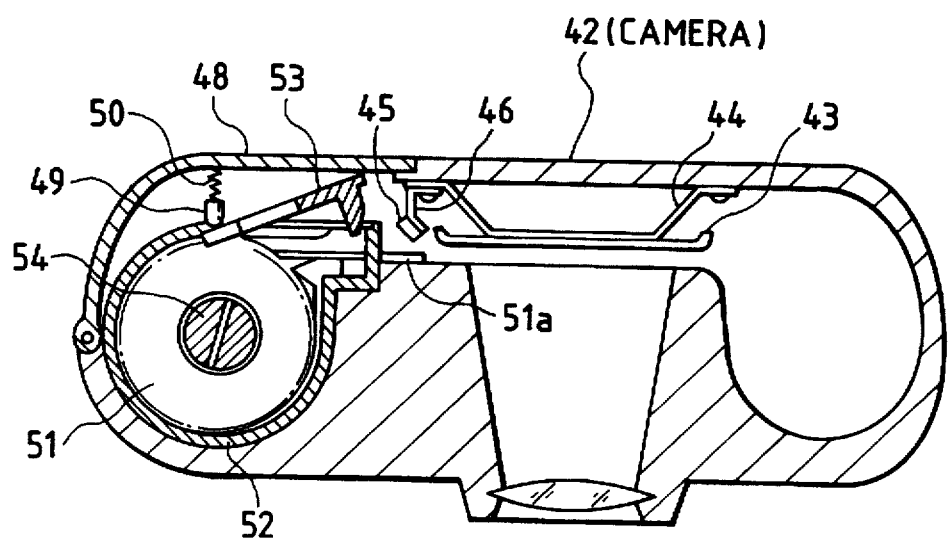
FIG. 16 is a horizontal cross-sectional view of the camera of the eighth embodiment in which the movable light shield cover is opened.

FIGS. 15 and 16 are horizontal cross-sectional views of a camera constituting an eighth embodiment of the present invention. In this embodiment, a photoreflector is positioned in opposed relationship to the movable light shield cover, thereby being capable of detecting the actual opened or closed state of the movable light shield cover by the light reflected therefrom. The present embodiment employs a film cartridge disclosed in the Japanese Patent Laid-Open Application No. 4-343353.

Referring to FIGS. 15 and 16, there are shown a camera body 42; a film pressure plate 43; a support member 44 for the film pressure plate 43; a photoreflector 45; a support member 46 for the photoreflector 45; a rear cover closure detecting switch 47; a rear cover 48; a member 49 for opening the movable light shield cover; a support member 50 for the movable light shield cover opening member 49; a film 51; a film 51a extracted from the cartridge; a main body 52 of the cartridge; a movable light shield cover 53; and a spool shaft 54 of the cartridge main body 52.

FIG. 15 illustrates a state in which the cartridge main body 52 is loaded in the camera body 42, while FIG. 16 illustrates a state in which the rear cover 48 is closed after the loading of the cartridge main body 52 into the camera body 42. As shown in FIG. 16, the closing of the rear cover 48 turns on the rear cover closure detecting switch 47 and opens the movable light shield cover 53 by means of the opening member 49.

In this embodiment, when the rear cover closure detecting switch 47 is turned on, light is emitted from a light-emitting element of the photoreflector 45 toward the movable light shield cover 53 and the reflected light therefrom is received by a photosensor of the photoreflector 45, whereby the opened or closed state of the movable light shield cover is identified from the intensity of the above-mentioned reflected light.

The embodiment explained above can securely ensure the operation of the movable light shield cover 4, as the photoreflector 45 is positioned opposed to the movable light shield cover 53 and directly detects the opened or closed state thereof by means of the light reflected therefrom.

In the foregoing embodiments, the opening or closing operation of the rear cover of the cartridge chamber is linked with that of the movable light shield cover of the loaded film cartridge, but, in case the movable light shield cover is singly opened or closed, the present invention may be so applied as to disconnect the linkage with an operating member for the movable light shield cover when said movable light shield cover is open.

Also the linkage between the movable light shield cover and the operating member therefor may be disconnected when the extracted state of the film from the loaded film cartridge is detected.

Also in the foregoing embodiments, alarm is given if the operating member for the movable light shield cover is so operated as to close said movable light cover of the loaded film cartridge when it is open, but such alarm may be generated in response to such closing operation of the movable light shield covet when the extracted state of the film from the film cartridge is detected.

Also in the foregoing embodiments, when the power supply is turned on, there are discriminated whether the movable light shield cover of the loaded film cartridge is open or closed, whether the film is extracted from the film cartridge and whether all the frames of the film have been exposed, but there may instead be executed one or two of these determinations.

Furthermore, the present invention is widely applicable to any cartridge containing an image recording medium other than the photographic film, or any other cartridge, as long as such cartridge is provided with an open/closable cover.

Furthermore, the present invention also covers any combination of the foregoing embodiments or of technical components thereof.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An apparatus adapted to use an image recording medium cartridge provided with a cover for at least one of introducing and extracting an image recording medium, comprising:
    a) a manual operation member;
    b) a response device that drives the cover of the cartridge, in response to an operation of said manual operation member; and
    c) a release device that releases said response device from responding to the operation of said manual operation member, in at least one of a state where the cover of the cartridge is open, and a state where the image recording medium is extracted from the cartridge.

2. An apparatus according to claim 1, wherein said image recording medium comprises a film.

3. An apparatus according to claim 1, wherein said manual operation member is configured to enable operation from the outside of the apparatus.

4. An apparatus according to claim 1, wherein said response device comprises an electrically driven device.

5. An apparatus according to claim 1, wherein said response device comprises a motor.

6. An apparatus according to claim 1, wherein said release device comprises means for disconnecting linkage between said manual operation member and said response device.

7. An apparatus according to claim 1, further comprising:
    alarm means for generating an alarm when said manual operation member is operated in at least one of the state where the cover of the cartridge is open, and the state where the image recording medium is extracted from the cartridge.

8. An apparatus according to claim 7, wherein said alarm means comprises means for acting on visual sense.

9. An apparatus according to claim 7, wherein said alarm means comprises means for acting on acoustic sense.

10. An apparatus according to claim 1, further comprising:
    alarm means for generating an alarm when said manual operation member is so operated as to close the cover, in at least one of the state where the cover of the cartridge is open, and the state where the image recording medium is extracted from the cartridge.

11. An apparatus according to claim 10, wherein said alarm means comprises means for acting on visual sense.

12. An apparatus according to claim 10, wherein said alarm means comprises means for acting on acoustic sense.

13. An apparatus according to claim 1, further comprising:
    determination means for determining, after a power supply is turned on, a state, prior to the turning-on of the power supply, of at least one of the cover of the cartridge loaded in said apparatus, and the image recording medium of the cartridge loaded in said apparatus.

14. An apparatus according to claim 13, wherein said determination means comprises a non-volatile memory.

15. An apparatus according to claim 13, further comprising:
    means for causing said camera to effect a different operation, in response to determining of said determination means.

16. An apparatus according to claim 13, wherein said determination means comprises means for determining at least one of (i) at least one of an opened state and a closed state of the cover of the cartridge loaded in said apparatus, (ii) a state whether the image recording medium of the cartridge loaded in said apparatus is extracted from the cartridge, and (iii) a state of use of the image recording medium of the cartridge loaded in said apparatus.

17. An apparatus according to claim 16, wherein said determination means comprises a non-volatile memory.

18. An apparatus according to claim 16, further comprising:
    means for causing said apparatus to effect a different operation, in response to said determination means.

19. An apparatus according to claim 1, further comprising:
    a non-volatile memory for memorizing at least one of a state of the cover of the cartridge loaded in said apparatus, and a state of the image recording medium of the cartridge loaded in said apparatus.

20. An apparatus according to claim 1, further comprising:
    a non-volatile memory for memorizing at least one of (i) at least one of an opened state and a closed state of the cover of the cartridge loaded in said apparatus, (ii) a state whether the image recording medium of the cartridge loaded in said apparatus is extracted from the cartridge, and (iii) a state of use of the image recording medium of the cartridge loaded in said apparatus.

21. An apparatus according to claim 1, further comprising:
    means for determining loading of the cartridge, based on opening and closing operations of a cover of a loading chamber for the cartridge.

22. An apparatus according to claim 1, further comprising:
    means for directly determining one of a state of the cover of the cartridge loaded in said apparatus, and a state of a member following the cover of the cartridge loaded in said apparatus.

23. An apparatus according to claim 13, further comprising:
    means for directly determining one of a state of the cover of the cartridge loaded in said apparatus, and a state of a member following the cover of the cartridge loaded in said apparatus.

24. An apparatus according to claim 19, further comprising:
    means for directly determining one of a state of the cover of the cartridge loaded in said apparatus, and a state of a member following the cover of the cartridge loaded in said apparatus.

25. An apparatus as recited in claim 1, wherein said apparatus comprises a camera.

26. An apparatus adapted to use (i) an image recording medium cartridge provided with a cover for at least one of extracting and introducing an image recording medium, and (ii) a power supply, said apparatus comprising:
    a determination device that determines, after the power supply is turned on, a state, prior to the turning-on of the power supply, of at least one of the cover of the cartridge loaded in said apparatus, and the image recording medium of the cartridge loaded in said apparatus; and an operation device that performs a predetermined operation responsive to said determination device.

27. An apparatus according to claim 26, wherein said apparatus is adapted to use an image recording medium cartridge containing a film.

28. An apparatus according to claim 26, wherein said determination portion includes a non-volatile memory.

29. An apparatus according to claim 26, wherein said determination portion comprises means for determining at least one of (i) a state of the cover of the cartridge loaded in said apparatus, (ii) a state whether the image recording medium of the cartridge loaded in said apparatus is extracted from the cartridge, and (iii) a state of use of the image recording medium of the cartridge loaded in said apparatus.

30. An apparatus according to claim 29, wherein said determination portion comprises a non-volatile memory.

31. An apparatus according to claim 29, further comprising:

means for directly determining one of a state of the cover of the cartridge loaded in said apparatus, and a state of a member following the cover of the cartridge loaded in said apparatus.

32. An apparatus as recited in claim 26, wherein said apparatus comprises a camera.

33. An apparatus adapted to use an image recording medium cartridge provided with a cover for at least one of extracting and introducing an image recording medium, comprising:

a non-volatile memory for memorizing at least one of a state of the cover of the cartridge loaded in said apparatus, and a state of the image recording medium of the cartridge loaded in said apparatus; and means for directly determining one of a state of the cover of the cartridge loaded in said apparatus and a state of a member following the cover of the cartridge loaded in said apparatus.

34. An apparatus according to claim 33, wherein said apparatus is adapted to use an image recording medium cartridge containing a film.

35. An apparatus as recited in claim 33, wherein said apparatus comprises a camera.

36. An apparatus adapted to use an image recording medium cartridge provided with a cover for at least one of extracting and introducing an image recording medium, comprising:

a non-volatile memory for memorizing at least one of (i) at least one of an opened state and a closed state of the cover of the cartridge loaded in said apparatus, (ii) a state whether the image recording medium of the cartridge loaded in said apparatus is extracted from the cartridge, and (iii) a state of use of the image recording medium of the cartridge loaded in said apparatus; and means for directly determining one of a state of the cover of the cartridge loaded in said apparatus and a state of a member following the cover of the cartridge loaded in said apparatus.

37. An apparatus according to claim 36, wherein said apparatus is adapted to use an image recording medium cartridge containing a film.

38. An apparatus as recited in claim 36, wherein said apparatus comprises a camera.

39. An apparatus adapted to use for an image recording medium cartridge provided with a light shield portion, comprising:

a) a manual operation member;

b) a response device that drives the light shield portion of the cartridge, in response to an operation of said manual operation member; and c) a release device that releases said response device from responding to the operation of said manual operation member, in at least one of a state where the light shield portion of the cartridge is open, and a state where an image recording medium is extracted from the cartridge.

40. An apparatus as recited in claim 39, wherein said apparatus comprises a camera.

41. An apparatus adapted to use (i) an image recording medium cartridge provided with a light shield portion, and (ii) a power supply, said apparatus comprising:

a determination portion for determining, after the power supply is turned on, a state, prior to the turning-on of the power supply, of at least one of the light shield portion of the cartridge loaded in said apparatus, and an image recording medium of the cartridge loaded in said apparatus.

42. An apparatus as recited in claim 41, wherein said apparatus comprises a camera.

43. An apparatus adapted to use an image recording medium cartridge provided with a light shield portion, comprising:

a non-volatile memory for memorizing at least one of a state of the light shield portion of the cartridge loaded in said apparatus, and a state of an image recording medium of the cartridge loaded in said apparatus.

44. An apparatus as recited in claim 43, wherein said apparatus comprises a camera.

45. An apparatus adapted to use an image recording medium cartridge provided with a light shield portion, comprising:

a non-volatile memory for memorizing at least one of (i) at least one of an opened state and a closed state of the light shield portion of the cartridge loaded in said apparatus, (ii) a state whether an image recording medium of the cartridge loaded in said camera is extracted from the cartridge, and (iii) a state of use of the image recording medium of the cartridge loaded in said apparatus.

46. An apparatus as recited in claim 45, wherein said apparatus comprises a camera.

47. An apparatus adapted to use an image recording medium cartridge provided with a light shield portion, comprising:

a determination portion for directly determining one of a state of the light shield portion of the cartridge loaded in said apparatus, and a state of a member following the light shield portion of the cartridge loaded in said apparatus.

48. An apparatus as recited in claim 47, wherein said apparatus comprises a camera.

49. An apparatus adapted to use an image recording medium cartridge provided with a cover for at least one of introducing and extracting an image recording medium, comprising:

a) operation means for operating the cover of the cartridge loaded in said apparatus;

b) detecting means for detecting at least one of a state where the cover of the cartridge is open and a state where the image recording medium is extracted from the cartridge; and c) alarm means for generating an alarm when said operation means is operated in at least one of a state where the cover of the cartridge is open, and a state where the image recording medium is extracted from the cartridge.

50. An apparatus as recited in claim 49, wherein said apparatus comprises a camera.

51. An apparatus for an image recording medium cartridge provided with a light shield portion, comprising:
   a) operation means for operating the light shield portion of the cartridge loaded in said apparatus;
   b) detecting means for detecting at least one of a state where the light shield portion of the cartridge is open and a state where the image recording medium is extracted from the cartridge; and
   c) alarm means for generating an alarm when said operation means is operated in at least one of a state where the light shield portion of the cartridge is open, and a state where the image recording medium is extracted from the cartridge.

52. An apparatus as recited in claim 51, wherein said apparatus comprises a camera.

53. An apparatus adapted to use an image recording medium cartridge provided with a cover for at least one of extracting and introducing an image recording medium, comprising:
   a memory for memorizing at least one of a state of the cover of the cartridge loaded in said apparatus, and a state of the image recording medium of the cartridge loaded in said apparatus; and
   detecting means for detecting at least one of a state of the cover of the cartridge loaded in said apparatus, and a state of the image recording medium of the cartridge loaded in said apparatus.

54. An apparatus as recited in claim 53, wherein said apparatus comprises a camera.

55. An apparatus adapted to use an image recording medium cartridge provided with a cover for at least one of extracting and introducing an image recording medium, comprising:
   a memory for memorizing at least one of (i) at least one of an opened state and a closed state of the cover of the cartridge loaded in said apparatus, (ii) a state whether the image recording medium of the cartridge loaded in said apparatus is extracted from the cartridge, and (iii) a state of use of the image recording medium of the cartridge loaded in said apparatus; and
   detecting means for detecting at least one of (i) at least one of an opened state and a closed state of the cover of the cartridge loaded in said apparatus, (ii) a state whether the image recording medium of the cartridge loaded in said apparatus is extracted from the cartridge, and (iii) a state of use of the image recording medium of the cartridge loaded in said apparatus.

56. An apparatus as recited in claim 55, wherein said apparatus comprises a camera.

* * * * *

UNITED STATES PATENT AND TRADEMARK OFFICE
CERTIFICATE OF CORRECTION

PATENT NO. : 5,754,904

DATED : May 19, 1998

INVENTOR(S): KAZUHIRO IZUKAWA

It is certified that error appears in the above-identified patent and that said Letters Patent is hereby corrected as shown below:

COLUMN 2:

Line 56, "f FIG. 12," should read --FIG. 12--.

COLUMN 10:

Line 49, "If" should read --if--.

COLUMN 12:

Line 48, "covet" should read --cover--.

Signed and Sealed this

Eighth Day of December, 1998

*Attest:*

BRUCE LEHMAN

*Attesting Officer*  *Commissioner of Patents and Trademarks*